(12) United States Patent
Fritz et al.

(10) Patent No.: US 8,989,968 B2
(45) Date of Patent: Mar. 24, 2015

(54) SELF-PROPELLED CIVIL ENGINEERING MACHINE SYSTEM WITH FIELD ROVER

(71) Applicant: Wirtgen GmbH, Windhagen (DE)

(72) Inventors: Matthias Fritz, Linz/Rhein (DE); Cyrus Barimani, Königswinter (DE); Günter Hähn, Königswinter (DE); Christian Berning, Brühl (DE)

(73) Assignee: Wirtgen GmbH (DE)

( * ) Notice: Subject to any disclaimer, the term of this patent is extended or adjusted under 35 U.S.C. 154(b) by 190 days.

(21) Appl. No.: 13/756,646

(22) Filed: Feb. 1, 2013

(65) Prior Publication Data

US 2014/0107883 A1    Apr. 17, 2014

Related U.S. Application Data

(60) Provisional application No. 61/713,076, filed on Oct. 12, 2012.

(51) Int. Cl.
*G06F 7/70* (2006.01)
*E01C 19/00* (2006.01)
(Continued)

(52) U.S. Cl.
CPC .............. *E01C 19/004* (2013.01); *G01C 15/00* (2013.01); *E01C 23/088* (2013.01); *G01C 15/06* (2013.01); *E01C 19/42* (2013.01); *G05D 1/0278* (2013.01); *G05D 2201/0202* (2013.01)
USPC ........ 701/50; 701/469; 701/408; 342/357.27; 342/357.34; 342/357.41; 342/357.47; 700/59

(58) Field of Classification Search
CPC ......... G01C 15/00; G01S 19/44; G01S 19/53; G01S 19/04; G01S 19/14; G01S 19/32; G01S 19/33; G01S 19/36; G01S 19/41; G01S 19/43; G01S 19/45; G01S 5/0063; A61B 5/1112; B62D 11/20; B62D 7/02
USPC .............................. 701/50, 408, 469; 342/357
See application file for complete search history.

(56) References Cited

U.S. PATENT DOCUMENTS

| 5,288,167 A | 2/1994 | Gaffard et al. |
| 5,519,620 A | 5/1996 | Talbot et al. |

(Continued)

FOREIGN PATENT DOCUMENTS

| DE | 19750315 A1 | 5/1998 |
| DE | 29918747 U1 | 2/2000 |

(Continued)

OTHER PUBLICATIONS

European Search Report in European Patent Application EP 13186239, dated Jan. 17, 2014, 2 pp.

(Continued)

*Primary Examiner* — Redhwan K Mawari
(74) *Attorney, Agent, or Firm* — Patterson Intellectual Property Law, PC; Lucian Wayne Beavers

(57) ABSTRACT

A civil engineering machine has a machine control unit configured to determine data which defines the position and/or orientation of a reference point on the civil engineering machine in relation to a reference system independent of the position and orientation of the civil engineering machine. A geometrical shape to be produced on the ground is preset in either a machine control unit or a field rover control unit. The field rover is used to determine a position of at least one identifiable point of the preset geometrical shape in the independent reference system. Curve data defining a desired curve in the independent reference system, corresponding to the preset shape, is determined at least partially on the basis of the position of the at least one identifiable point of the preset geometrical shape in the independent reference system.

37 Claims, 17 Drawing Sheets

(51) Int. Cl.
*G01C 15/00* (2006.01)
*E01C 23/088* (2006.01)
*G01C 15/06* (2006.01)
*E01C 19/42* (2006.01)
*G05D 1/02* (2006.01)

(56) References Cited

U.S. PATENT DOCUMENTS

| | | | |
|---|---|---|---|
| 5,549,412 A | 8/1996 | Malone | |
| 5,612,864 A * | 3/1997 | Henderson | 700/59 |
| 5,631,658 A | 5/1997 | Gudat et al. | |
| 5,838,277 A | 11/1998 | Loomis et al. | |
| 5,929,807 A | 7/1999 | Viney et al. | |
| 6,027,282 A | 2/2000 | Horn | |
| 6,047,227 A | 4/2000 | Henderson et al. | |
| 6,052,083 A * | 4/2000 | Wilson | 342/357.34 |
| 6,074,693 A | 6/2000 | Manning | |
| 6,088,644 A | 7/2000 | Brandt et al. | |
| 6,113,309 A | 9/2000 | Hollon et al. | |
| 6,140,957 A | 10/2000 | Wilson et al. | |
| 6,144,318 A | 11/2000 | Hayashi et al. | |
| 6,191,732 B1 | 2/2001 | Carlson et al. | |
| 6,287,048 B1 | 9/2001 | Hollon et al. | |
| 6,371,566 B1 | 4/2002 | Haehn | |
| 6,425,186 B1 | 7/2002 | Oliver | |
| 6,481,924 B1 * | 11/2002 | Smolders et al. | 404/105 |
| 6,655,465 B2 | 12/2003 | Carlson | |
| 6,736,216 B2 | 5/2004 | Savard | |
| 6,769,836 B2 | 8/2004 | Lloyd | |
| 6,950,059 B2 | 9/2005 | Rapoport | |
| 7,002,513 B2 | 2/2006 | Brabec | |
| 7,363,154 B2 | 4/2008 | Lindores | |
| 7,399,139 B2 | 7/2008 | Kieranen | |
| 7,491,014 B2 | 2/2009 | Sick | |
| 7,617,061 B2 | 11/2009 | Brabec | |
| 7,643,923 B2 | 1/2010 | Buehlmann et al. | |
| 7,946,787 B2 | 5/2011 | Glee et al. | |
| 8,018,376 B2 | 9/2011 | McClure | |
| 8,174,437 B2 | 5/2012 | Whitehead | |
| 8,271,194 B2 | 9/2012 | Whitehead | |
| 8,388,263 B2 | 3/2013 | Fritz et al. | |
| 8,613,566 B2 | 12/2013 | Fritz et al. | |
| 2004/0057795 A1 | 3/2004 | Mayfield et al. | |
| 2004/0130485 A1 * | 7/2004 | Rapoport et al. | 342/357.03 |
| 2004/0193348 A1 | 9/2004 | Gray et al. | |
| 2008/0208417 A1 | 8/2008 | Buehlmann et al. | |
| 2008/0253834 A1 | 10/2008 | Colvard | |
| 2009/0322600 A1 * | 12/2009 | Whitehead et al. | 342/357.06 |
| 2010/0023229 A1 | 1/2010 | Chiocco | |
| 2011/0150572 A1 | 6/2011 | Fritz et al. | |
| 2011/0229264 A1 | 9/2011 | Weiser | |
| 2012/0101725 A1 | 4/2012 | Kondekar | |
| 2014/0081532 A1 | 3/2014 | Fritz et al. | |

FOREIGN PATENT DOCUMENTS

| | | |
|---|---|---|
| DE | 29918748 U1 | 2/2000 |
| DE | 69131837 T2 | 6/2000 |
| DE | 19951296 A1 | 6/2001 |
| EP | 1103659 A2 | 5/2001 |
| EP | 1118713 A1 | 7/2001 |
| EP | 2119832 A1 | 11/2009 |
| EP | 2336424 A2 | 6/2011 |
| WO | 9203701 A1 | 3/1992 |
| WO | 9516228 A1 | 6/1995 |
| WO | 2004028060 A2 | 4/2004 |

OTHER PUBLICATIONS

European Search Report in European Patent Application EP 13186253, dated Jan. 24, 2014, 2 pp.

* cited by examiner

SELF-PROPELLED CIVIL ENGINEERING MACHINE SYSTEM WITH FIELD ROVER

BACKGROUND OF THE INVENTION

The invention relates to a self-propelled civil engineering machine, and in particular a road milling machine, road paver or slipform paver, and to a method of controlling a self-propelled civil engineering machine and in particular a road milling machine, road paver or slipform paver.

DESCRIPTION OF THE PRIOR ART

There are a variety of known kinds of self-propelled civil engineering machines. In particular, these machines include the known slipform pavers, road pavers and road milling machines. The characteristic feature of these self-propelled civil engineering machines is that they have a working unit having working means for producing structures on the ground or for making changes to the ground.

In the known slipform pavers, the working unit comprises an arrangement for moulding flowable material and in particular concrete, which arrangement will be referred to in what follows as a concrete mould. Structures of different types, such as crash barriers and road gutters, can be produced with the concrete mould. A slipform paver is described EP 1 103 659 B1 (U.S. Pat. No. 6,481,924) for example.

The known road pavers generally have a screed as their working unit. The screed is so arranged, at that end of the road paver which is at the rear looking in the direction of paving, that it is supported by a lower sliding plate on the material of the road covering being laid and a pre-compression of the material thus takes place.

The working unit of the known road milling machines is a milling arrangement which has a milling drum fitted with milling tools, by which milling drum material can be milled off the ground over a preset working width.

The known self-propelled civil engineering machines also have a drive unit which has drive means to allow movements in translation and/or rotation to be performed, and a control unit for controlling the drive unit in such a way that the civil engineering machine performs movements in translation and/or rotation on the ground.

When self-propelled civil engineering machines are controlled automatically, the problem arises that a preset reference point on the civil engineering machine has to move precisely along a preset curve in space on the ground, in order for example to enable a structure of a preset shape to be produced on the ground in the correct position and in the correct orientation.

A known method of controlling slipform pavers presupposes the use of a guiding wire or line which lays down the desired curve along which the reference point on the civil engineering machine is to move. Elongated objects, such as crash barriers or road gutters for example, can be produced effectively by using a guiding wire or line. However, the use of a guiding wire or line is found to be a disadvantage when structures of small dimensions, such as cigar-shaped traffic islands for example, which are distinguished by extending for small distances and having tight radiuses, are to be produced.

It is also known for self-propelled civil engineering machines to be controlled by using a satellite-based global positioning system (GPS). A civil engineering machine having a GPS receiver is known from U.S. Pat. No. 5,612,864 for example.

It is a disadvantage that the plotting of the position of an object using a master measurement system to control the civil engineering machine calls for a great deal of technical cost and complication because the construction project will be complex and the object has to be fitted into it. What is particularly costly and complicated is the plotting which has to be done of the positions of various reference points in the measurement system. This cost and complication can only be justified for large objects. For small objects on the other hand the cost and complication is disproportionately high.

Another disadvantage of the objects being fitted into the complex building project lies in the fact that in practice, with small objects, allowance often has to be made for fixed points, such for example as existing hydrants or water outlets on the site, which may possibly not be situated precisely at the points at which they were entered in the plans. Should the project data not agree with the actual local facts, the project data has to be amended off the site in the office at relatively high cost and the amended project data then has to be read in again on the site.

SUMMARY OF THE INVENTION

The object underlying the invention is therefore to provide a self-propelled civil engineering machine, and in particular a road milling machine, a road paver or a slipform paver, which can move automatically, without any great cost or complication in the plotting of position and with high accuracy, along a desired curve extending for relatively short distances of travel and having tight radiuses. Another object is to specify a method which allows a self-propelled civil engineering machine to be controlled automatically, without any great cost or complication in the plotting of position and with high accuracy, along a desired curve extending for relatively short distances of travel and having tight radiuses.

The self-propelled civil engineering machine according to the invention has a control unit which has means for presetting a given geometrical shape for the structure to be produced or the ground to which changes are to be made. This given shape may for example be a traffic island in the shape of a cigar. It may be entered or selected by the operator of the machine.

The control unit of the self-propelled civil engineering machine according to the invention also has means for determining data which defines the position and/or orientation of a reference point on the civil engineering machine in relation to a reference system which is independent of the position and orientation of the civil engineering machine. The reference system (X,Y,Z) independent of the machine-related reference system (x,y,z) can be selected as desired, and there is thus no need for the positions of various reference points to be plotted on the ground.

In one mode of operation of the control system of the civil engineering machine, the civil engineering machine is moved to a preset starting point on the ground which can be freely selected. At the preset starting point the civil engineering machine is aligned in a preset orientation. The position and orientation of the object are thus laid down. Consequently, the object can always be optimally positioned on the ground with due allowance made for any possible fixed points. The starting point may for example be sited at the corner of a gutter already present on the ground whose position need not exactly correspond to the layout plan.

As well as this, the control unit of the civil engineering machine also has means for determining data defining a desired curve, the desired curve being the curve along which the reference point (R) on the civil engineering machine is to move in the reference system (X, Y, Z) independent of the position and orientation of the civil engineering machine. The means for determining data defining the desired curve are so designed that the data defining the desired curve is determined on the basis of the preset geometrical shape of the structure to be produced or the ground to which changes are to be made and on the basis of the position and orientation of the reference point (R) on the civil engineering machine in the reference system (X, Y, Z) independent of the position and orientation of the civil engineering machine.

The data which defines the desired curve may be the distance covered by the desired curve and/or its curvature. This data is dependent on the shape of the object.

In a preferred embodiment, the means for controlling the drive unit are so designed that the drive unit is so controlled, as a function of the position and orientation of the reference point in the reference system independent of the position and orientation of the civil engineering machine, that the distance between the desired position of the civil engineering machine, as defined by the desired curve, and its actual position, and/or the difference in direction between the desired direction, as defined by the desired curve, and the actual direction, is minimal. The control algorithms required for this purpose are well known to the person skilled in the art.

An embodiment of the invention which is a particular preference makes provision for use to be made of a satellite-based global positioning system (GPS) to determine the position and/or orientation of the reference point on the civil engineering machine. The reference system (X,Y,Z) independent of the position and orientation of the civil engineering machine is thus the reference system of the satellite-based global positioning system, whose position and direction relative to the machine-related reference system (x,y,z) constantly change as the civil engineering machine moves over the ground. The civil engineering machine has a first and a second DGPS receiver for decoding the GPS satellite signals from the satellite-based global positioning system and correcting signals from a reference station for determining the position and/or orientation of the civil engineering machine, the first and second DGPS receivers being arranged in different positions on the civil engineering machine.

However, rather than by means of a satellite-based global positioning system, the position and/or orientation of the reference point may also be determined with a non-satellite measurement system. The only thing that is crucial is for the control unit to receive data defining the position and orientation of the reference point in the reference system (X,Y,Z) independent of the civil engineering machine.

In a further preferred embodiment, the control unit has an input unit having means (7B) for the input of parameters which define the geometrical shape of the structure to be produced or the ground to which changes are to be made. These parameters may for example be parameters which define the length of a straight line and/or the radius of an arc of a circle. It is assumed in this case that the object can be broken down into straight lines and arcs. This can be done for example in the case of a traffic island in the shape of a cigar. However, it is also possible for other geometrical figures to be defined by the parameters.

In a further preferred embodiment, the control unit has an input unit having means for selecting one geometrical shape from a plurality of preset geometrical shapes, the plurality of geometrical shapes being stored in a storage unit which cooperates with the input unit. The advantage of this is that the data defining the geometrical shape does not have to be created afresh and instead recourse may be had to data sets which have already been created. A choice may for example be made between a circle and a cigar shape as an object.

A further embodiment which is a particular preference makes provision for means for modifying a preset geometrical shape. The advantage that this has is that the shape of a cigar for example may be selected and the dimensions of the cigar can then be adjusted to suit the actual requirements on the site.

In a further embodiment, a field rover is provided which may be used to determine some or all of the curve data in the independent reference system (X,Y,Z). The field rover may include a rover control unit having a rover shape selection component, a rover position data determination component, and a rover curve data determination component.

In another embodiment a method of controlling a self-propelled civil engineering machine is provided wherein a field rover is utilized to determine a position of at least one identifiable point of a preset geometrical shape in a reference system independent of the position and orientation of the civil engineering machine. Then curve data defining a desired curve is determined in part on the basis of the position of the at least one identifiable point of the preset geometrical shape as determined by the rover.

In another embodiment a self-propelled civil engineering machine system includes a civil engineering machine and a field rover. The civil engineering machine may include a machine chassis, a working unit arranged on the chassis, a drive unit, and a machine control unit. The field rover may include a rover control unit including a rover shape selection component. Each of the following components is included in at least one of the machine control unit and the rover control unit:

a shape selection component operable to preset a geometrical shape for the structure to be produced or for the ground to which changes are to be made;

a machine position data determination component operable to determine position data to define the position and/or orientation of a reference point on the civil engineering machine in relation to the reference system which is independent of the position and orientation of the civil engineering machine;

a curve data determination component operable to determine curve data to define a desired curve based on the preset geometrical shape of the structure to be produced or the ground to which changes are to be made and based on a desired position and orientation of the preset geometrical shape in the reference system independent of the position and orientation of the civil engineering machine, the desired curve being that curve along which the reference point on the civil engineering machine is to move in the reference system independent of the position and orientation of the civil engineering machine; and a drive control component operable to control the drive unit, as a function of the curve data defining the desired curve, in such a way that the reference point on the civil engineering machine moves along the desired curve.

In another embodiment a self-propelled civil engineering machine system includes a civil engineering machine including a machine chassis and a working unit arranged on the chassis. A drive unit drives the machine. A machine control unit is operable to control the movement of the machine. The machine control unit includes a machine data determination component and a drive control component. The machine data determination component may include a field rover mounted on the civil engineering machine, the field rover being removable from the civil engineering machine so that the field rover may be used separately to survey positions on the ground.

In another embodiment a hand held field rover apparatus includes a control unit having a position data determination component, a shape fitting component and a shape storing component. The shape fitting component is configured to define a defined shape corresponding to a series of surveyed positions, the shape fitting component being configured such that a user may select for at least some of the surveyed positions whether the positions are part of a straight line portion or part of a curved portion of the defined shape.

In another embodiment the shape fitting component may include a shape smoothing component configured such that the user may selectively use position data in defining the defined shape. The shape smoothing component may be configured such that the user may select for each surveyed position to use the position data only with regard to the elevation position or the horizontal position of the defined shape. The shape smoothing component may be configured such that the user may select for each surveyed position to not include the position data in defining the defined shape. The determinations for use of position data may be made in response to queries posed by the shape fitting component.

In another embodiment a hand held field rover survey apparatus includes a control unit including a shape selection component, a position data determination component and a curve data determination component.

In another embodiment a method of surveying using a hand held field rover is provided. The field rover includes a support rod having a lower end for engaging a ground surface and a position sensor mounted on the support rod. The field rover is used to determine a series of surveyed positions of a geometrical shape for a structure to be produced or the ground to which changes are to be made. For at least some of the surveyed positions a selection is made whether the positions are part of a straight line portion or part of a curved portion of the geometrical shape. A defined shape is then defined corresponding to the series of surveyed positions.

Embodiments of the invention will be explained in detail in what follows by reference to the drawings.

BRIEF DESCRIPTION OF THE DRAWINGS

In the drawings:

In FIG. 13 a first point has been surveyed.

DETAILED DESCRIPTION

Figure 1:
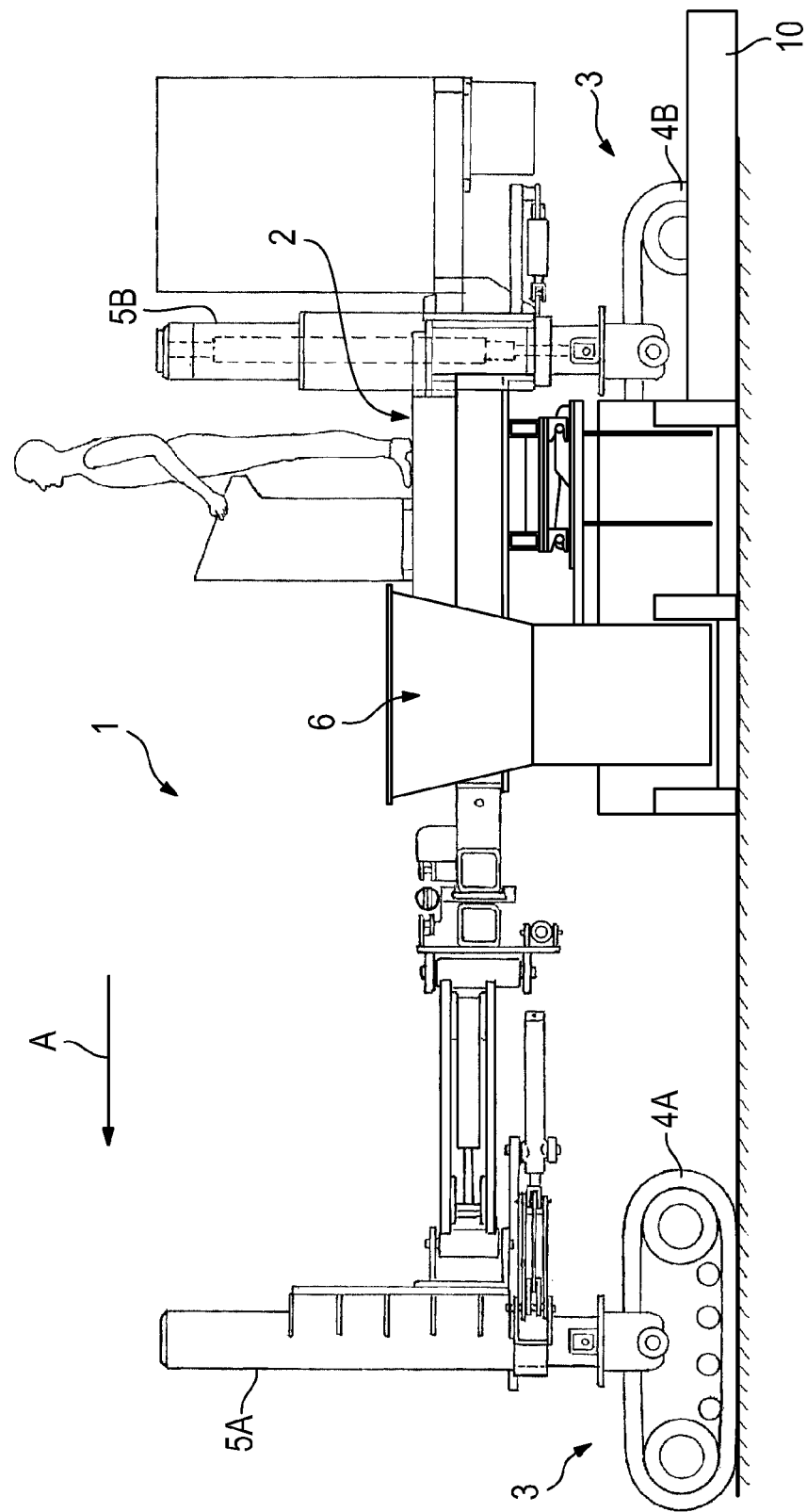
FIG. 1 is a side view of an embodiment of slipform paver.

FIG. 1 is a side view of, as an example of a self-propelled civil engineering machine, a slipform paver which is described in detail in EP 1 103 659 B1 (U.S. Pat. No. 6,481,924). Because slipform pavers as such are part of the prior art, all that will be described here are those components of the civil engineering machine which are material to the invention.

The slipform paver 1 has a chassis 2 which is carried by running gear 3. The running gear 3 has two front and two rear track-laying running gear units 4A, 4B which are fastened to front and rear lifting pillars 5A, 5B. The direction of working (direction of travel) of the slipform paver is identified by an arrow A.

The track-laying running gear units 4A, 4B and the lifting pillars 5A, 5B are parts of a drive unit of the slipform paver which has drive means to allow the civil engineering machine to carry out movements in translation and/or rotation on the ground. By raising and lowering the lifting pillars 5A, 5B, the chassis 2 of the machine can be moved relative to the ground to adjust its height and inclination. The civil engineering machine can be moved backwards and forwards by the track-laying running gear units 4A, 4B. The civil engineering machine thus has three degrees of freedom in translation and three degrees of freedom in rotation.

The slipform paver 1 has an arrangement 6, which is only indicated, for moulding concrete which will be referred to in what follows as a concrete mould. The concrete mould is part of a working unit which has working means for producing a structure 10 of a preset shape on the ground.

Figure 2:
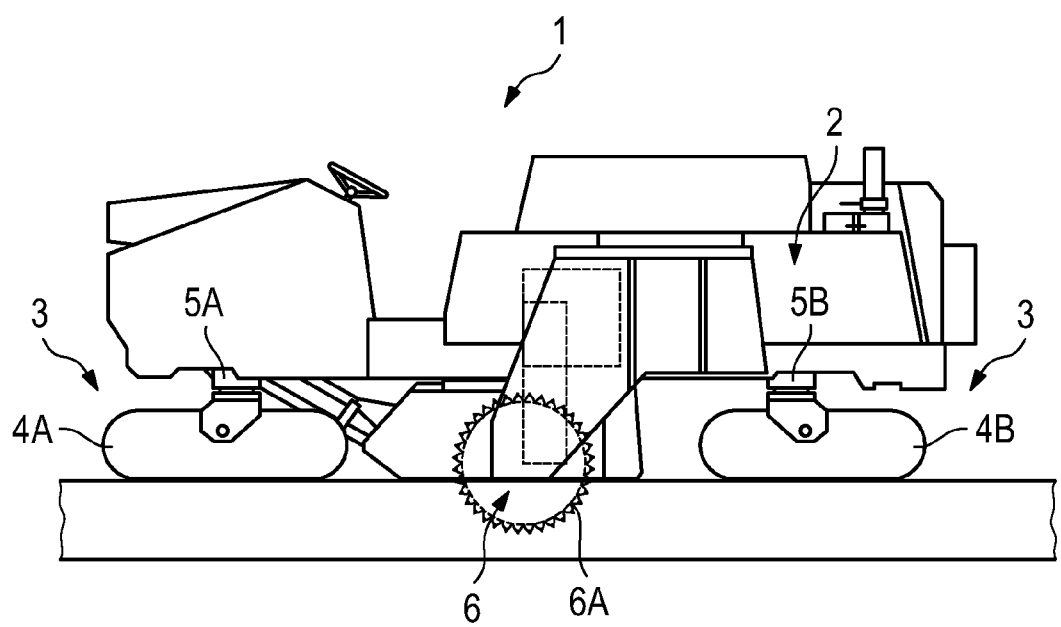
FIG. 2 is a side view of an embodiment of road milling machine.

FIG. 2 is a side view of, as a further example of a self-propelled civil engineering machine, a road milling machine. Once again, the road milling machine 1 too has a chassis 2 which is carried by running gear 3. The running gear 3 has two front and two rear track-laying running gear units 4A, 4B which are fastened to front and rear lifting pillars 5A, 5B. The road milling machine has a working unit which has working means to make changes to the ground. This working unit is a milling arrangement 6 which has a milling drum 6A fitted with milling tools.

Figure 3:
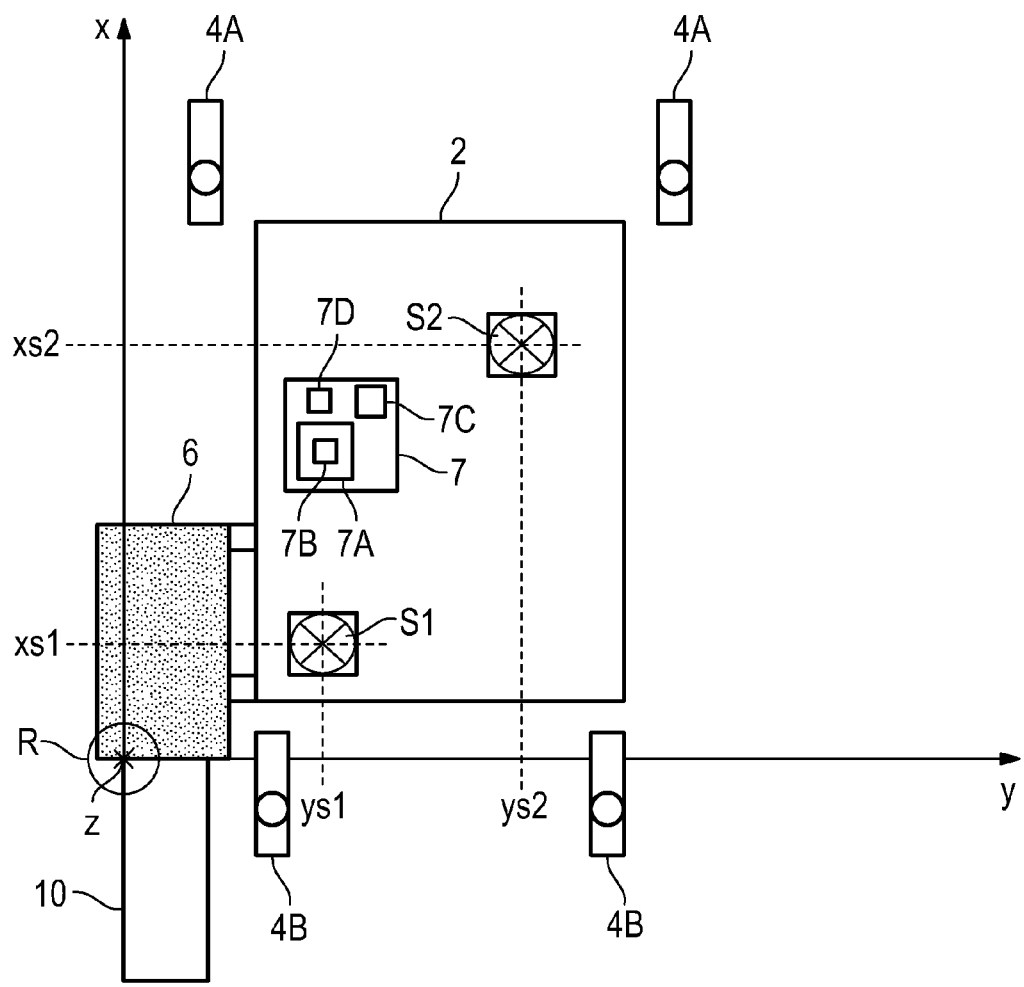
FIG. 3 shows a machine co-ordinate system related to a civil engineering machine together with the civil engineering machine, which is merely indicated.

FIG. 3 shows the self-propelled civil engineering machine in a machine-related Cartesian co-ordinate system (x, y, z). The civil engineering machine may be a slipform paver, a road milling machine or any other civil engineering machine which has an appropriate working unit. The present embodiment is a slipform paver 1 which has a concrete mould 6. The slipform paver 1 and the concrete mould 6 are merely indicated. It has the chassis 2, having the track-laying running gear units 4A, 4B, and the concrete mould 6.

The origin of the machine co-ordinate system is at a reference point R on the slipform paver 1, what is laid down as the reference point R being that edge of the concrete mould 6 which is on the inside and at the rear in the direction of travel. This edge corresponds to the outer boundary of the structure 10 to be produced. In the machine co-ordinate system, the reference point R is determined as follows:

$$R = xR, yR, zR = 0,0,0$$

The machine co-ordinate system is clearly defined by six degrees of freedom, with the lengths of travel dx, dy, dz defining the movements in translation and the angles ω, φ, η defining the three movements in rotation.

To simplify things, it will be assumed that the civil engineering machine is standing on flat ground and is not inclined. The angles ω and η in rotation are thus each equal to zero. The machine co-ordinate system and the civil engineering machine are aligned to one another in such a way that the angle ω in rotation is equal to zero as well.

It will also be assumed that the bottom edge of the concrete mould 6 is resting on the ground. This lays it down that the height zR of the reference point R is not to change as the civil engineering machine moves over the flat ground.

Figure 4:
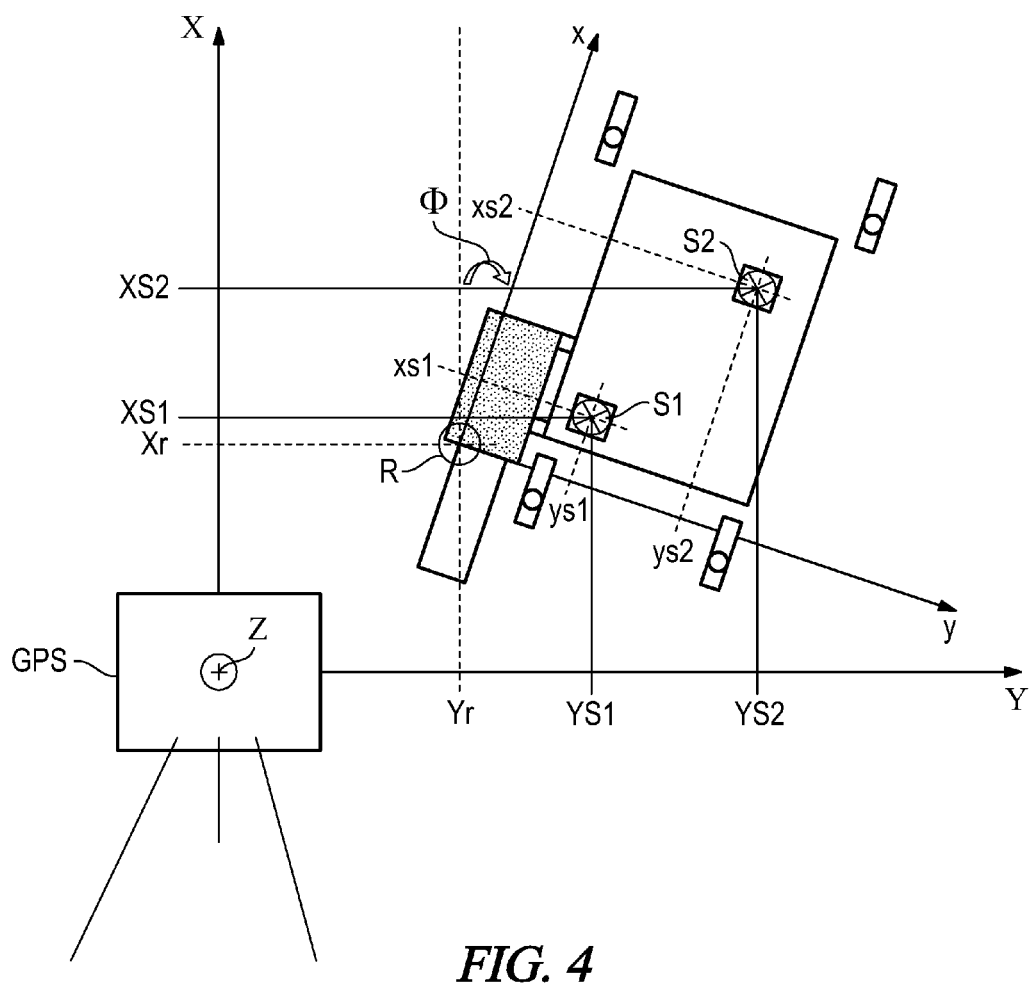
FIG. 4 shows a measurement co-ordinate system (X,Y,Z) independent of the position and orientation of the civil engineering machine together with the machine related co-ordinate system (x,y,z) and civil engineering machine which are shown in FIG. 3.

FIG. 4 shows the machine co-ordinate system together with a Cartesian reference system, independent of the machine co-ordinate system (x, y, z), which will be referred to in what follows as the measurement co-ordinate system (X, Y, Z). The measurement co-ordinate system (X, Y, Z) may be selected at random. It remains in the same position and orientation as the civil engineering machine moves.

To control the drive unit, the civil engineering machine has a control unit 7 which is merely indicated. The control unit 7 controls the drive means of the drive unit in such a way that the civil engineering machine performs the requisite movements in translation and/or rotation on the ground to enable it to produce the structure 10 or make changes to the ground. The control unit 7 comprises all the components which are required to perform calculating operations and to generate control signals for the drive means of the drive unit. It may form a self-contained unit or it may be part of the central control system of the civil engineering machine.

To allow the drive unit to be controlled, the position and/or orientation of the reference point R of the civil engineering machine in the machine co-ordinate system (x, y, z) is transposed into the measurement co-ordinate system (X, Y, Z) independent of the movements of the civil engineering machine.

In the present embodiment, the position and orientation of the reference point R are determined using a satellite-based global positioning system (GPS), which is only indicated in FIG. 4. However, rather than a satellite-based positioning system what may also be used is a non-satellite terrestrial measuring system (a total station). Because the requirements for the accuracy with which position and orientation are determined are stringent ones, what is preferably used is that satellite-based global positioning system which is known as the differential global positioning system (DGPS). The GPS-based method of determining orientation is based in this case on the measurement of position by two DGPS receivers which are arranged at different points S1, S2 on the civil engineering machine.

The two DPGS receivers S1 and S2 are merely indicated in FIGS. 3 and 4. The case assumed is the more general one where the DGPS receiver S1 and the DGPS receiver S2 are situated near the origin of the machine co-ordinate system in which the reference point R is sited, the position and orientation of which reference point R are determined in the measurement co-ordinate system.

The positions of the DGPS receivers S1 and S2 are determined in the machine co-ordinate system (x, y, z) by the co-ordinates S1=xs1, ys1, zs1 and S2=xs2, ys2, zs2. In the measurement co-ordinate system (X, Y, Z), the positions of the DGPS receivers S1 and S2 are determined by S1=XS1, YS1, ZS1 and S2=XS2, YS2, ZS2.

By using the two DGPS receivers S1 and S2, the control unit 7 employs the GPS system to determine data which defines the position of the DGPS receivers. From this data on position, the control unit 7 then calculates the position and orientation of the reference point R on the civil engineering machine near to which the two DGPS receivers are situated. For this purpose, the control unit 7 performs a transformation with the rotation matrix R to transform the co-ordinates at the points S1 and S2 which were measured in the measurement co-ordinate system (X, Y, Z) by the DGPS receivers S1 and S2 to give the reference point R $$\begin{bmatrix} \Delta X \\ \Delta Y \\ \Delta Z \end{bmatrix} = \begin{bmatrix} XS1 - xs1 \\ YS1 - ys1 \\ ZS1 - zs1 \end{bmatrix}$$

$$\begin{bmatrix} X \\ Y \\ Z \end{bmatrix} = [R] \begin{bmatrix} x \\ y \\ z \end{bmatrix} + \begin{bmatrix} \Delta X \\ \Delta Y \\ \Delta Z \end{bmatrix}$$

$$\begin{bmatrix} X \\ Y \\ Z \end{bmatrix} = \begin{bmatrix} \cos\phi & -\sin\phi & 0 \\ \sin\phi & \cos\phi & 0 \\ 0 & 0 & 1 \end{bmatrix} \begin{bmatrix} x \\ y \\ z \end{bmatrix} + \begin{bmatrix} \Delta X \\ \Delta Y \\ \Delta Z \end{bmatrix}$$

The result is that the control unit determines the measurement co-ordinates of the reference point R on the concrete mould 6 of the slipform paver 1 in the measurement co-ordinate system (X, Y, Z):

$$R = \begin{bmatrix} Xr \\ Yr \\ Zr \end{bmatrix}$$

The control unit uses the following equation to calculate the angle Φ giving the direction of the civil engineering machine from the co-ordinates (XS2, XS1; YS2, YS1) of the measured points S1 and S2:

$$\Phi = \arctan(XS2 - XS1/YS2 - YS1)$$

The control unit 7 controls the drive unit of the civil engineering machine in such a way that the civil engineering machine moves along a preset desired curve, i.e. the reference point R on the civil engineering machine moves along the desired curve.

In its general form, the desired curve can be defined as follows as a function of distance travelled and curvature:

$$\begin{bmatrix} X \\ Y \end{bmatrix} = f(L) = \int_{\sin\alpha}^{\cos\alpha} (dl) = \begin{bmatrix} X0 \\ Y0 \end{bmatrix}$$

where $$\alpha = \int K(dl).$$

The curvature K is defined by K=1/R.

As an alternative to the system just described using two DGPS receivers, it is also to devise a control system using a single DGPS receiver. Such a control system would lock the rear drive tracks 4B in a straight forward position. The machine could then automatically follow a curve based on the data of just one DGPS sensor because there is a fixed center of rotation at the locked tracks. In this case the orientation of the machine could be determined by observing the position data of the one DGPS sensor, the alignment of the steerable front tracks 4A and the distance driven.

In the present embodiment, the slipform paver is to produce a traffic island in the shape of a "cigar". The geometrical shape of the cigar is defined by a curve which comprises two parallel distances travelled and two arcs of a circle. What will be described in what follows will be only that part of the curve which comprises the initial straight line and the first semi-circular arc.

In the embodiment of the cigar, the curvature on the initial straight line is equal to zero. When the reference point R on the civil engineering machine moves along the first arc of a circle, the curvature is constant. Once the civil engineering machine has ceased to move along the arc, the curvature once again becomes zero.

Figure 5:
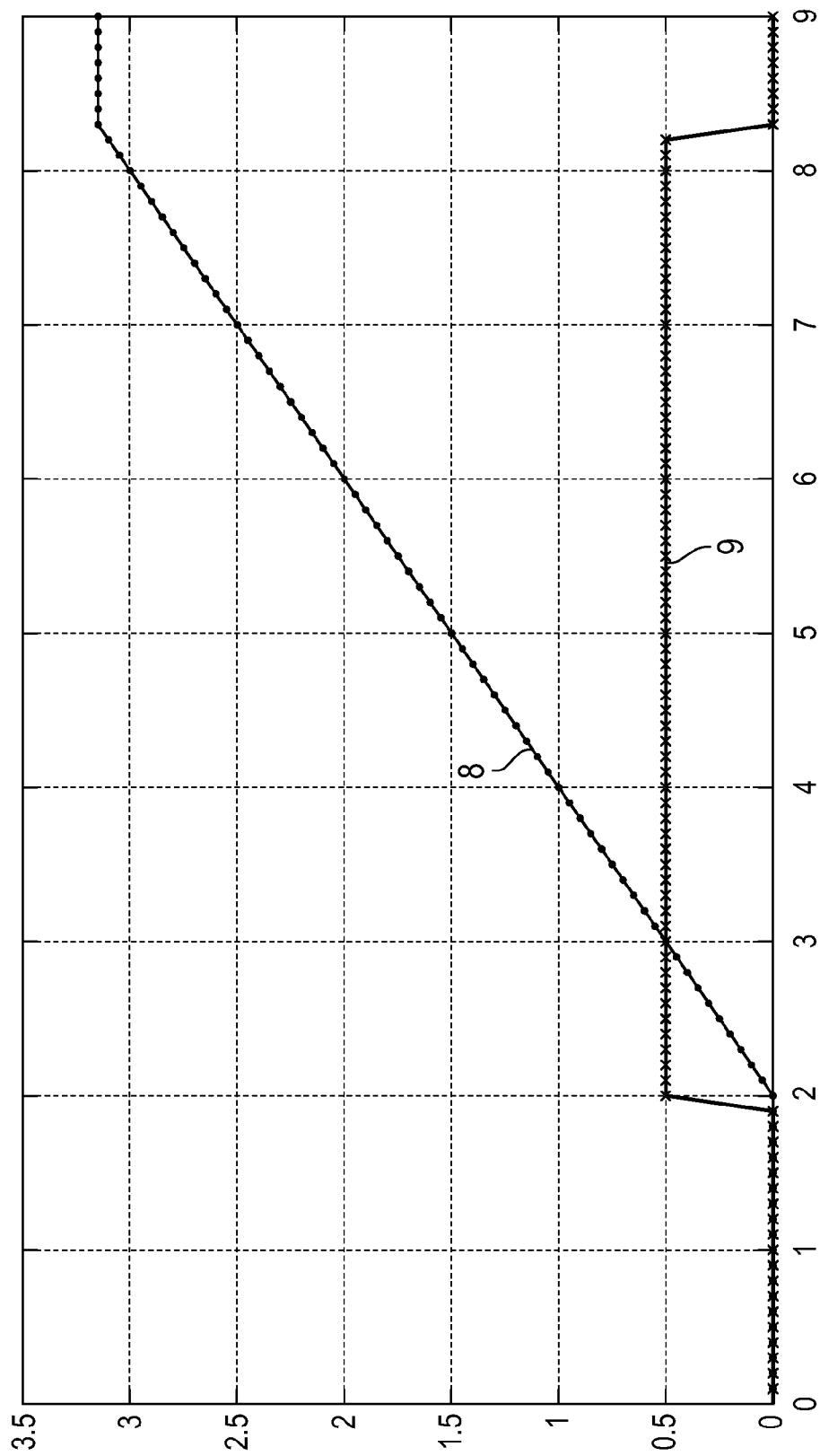
FIG. 5 shows the graph curves for curvature and direction for an object in the shape of a cigar.

FIG. 5 shows the graph plot 9 for curvature and the graph plot 8 for direction for the slipform paver when producing a cigar whose geometrical shape is defined by a straight line of a length of 2 m and by a semi-circular arc whose radius is 2 m. The length and radius constitute in this case two parameters by which the geometrical shape of the cigar is preset. It will be clear that the graph plot for direction changes as the civil engineering machine enters the arc.

Figure 6:
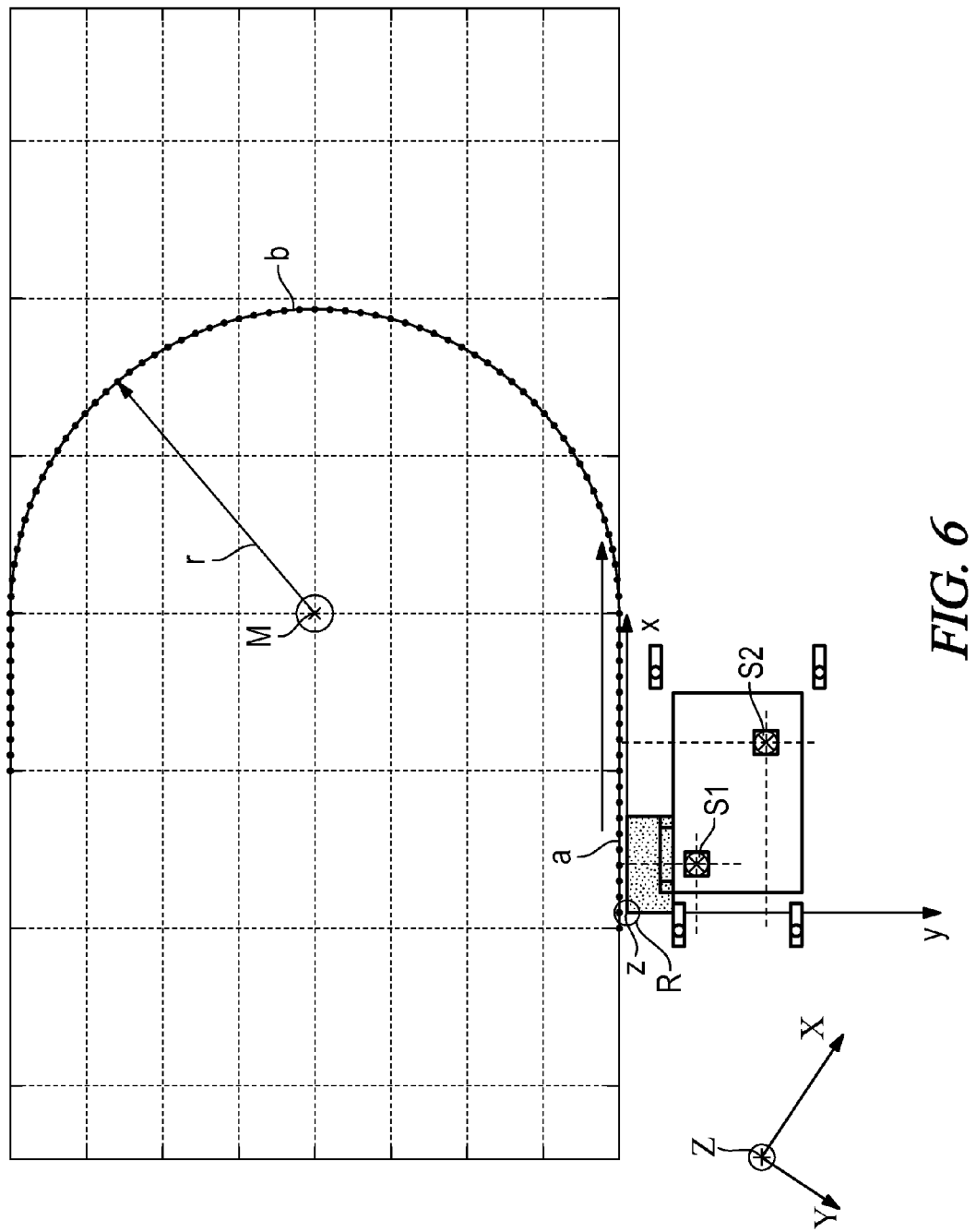
FIG. 6 is a view of the geometrical shape defining a cigar-shaped object for controlling the civil engineering machine, before it is transposed into the measurement co-ordinate system (X,Y,Z).

The operator of the civil engineering machine first presets a given geometrical shape such as the shape of a cigar for example. The operator is free as to the geometrical shape he presets. FIG. 6 shows the geometrical shape which is defined by a straight line "a" and a semi-circular arc "b". Simply to make things clear, the geometrical shape of the cigar has been shown in a grid which relates to the machine co-ordinate system (x,y,z). The measurement co-ordinate system (X, Y, Z) has therefore been indicated in FIG. 6 only to show the relationship between the machine and measurement co-ordinate systems.

The control system according to the invention relies on a starting point at which the production of the structure 10, such as a cigar for example, begins first being freely selected for the slipform paver on the ground. This starting point corresponds to the origin of the machine co-ordinate system, i.e. the reference point R (FIG. 6). The starting point may for example be situated next to a fixed point which is preset on the ground, such as a water inlet for example. The starting point defines the place at which the structure 10, such as the cigar for example, is to be produced. The orientation of the civil engineering machine is preset freely at the starting point, thus laying down the direction in which the structure 10, such as the cigar for example, is to extend.

The civil engineering machine is now driven to the selected starting point and is aligned in the preset orientation. This process is not automated. The automated control of the civil engineering machine then takes place.

The civil engineering machine having been positioned and aligned, the control unit 7 determines for the starting point the data which defines the position and orientation of the reference point R in the measurement co-ordinate system (X, Y, Z). This data which defines the position and orientation of the reference point R may be referred to as position data. For the subsequent control, the preset geometrical shape, such as the cigar for example, then has to be transposed to the measurement co-ordinate system (X, Y, Z). On the basis of the preset geometrical shape of the structure to be produced or of the ground to which changes are to be made and on the basis of the position and orientation of the reference point R on the civil engineering machine in the measurement co-ordinate system (X, Y, Z) which is independent of the position and orientation of the civil engineering machine, the control unit 7 determines data which defines a desired curve, the desired curve being that curve along which the reference point R on the civil engineering machine is to move in the measurement co-ordinate system (X, Y, Z). The data defining the desired curve may be referred to as curve data.

Figure 7:
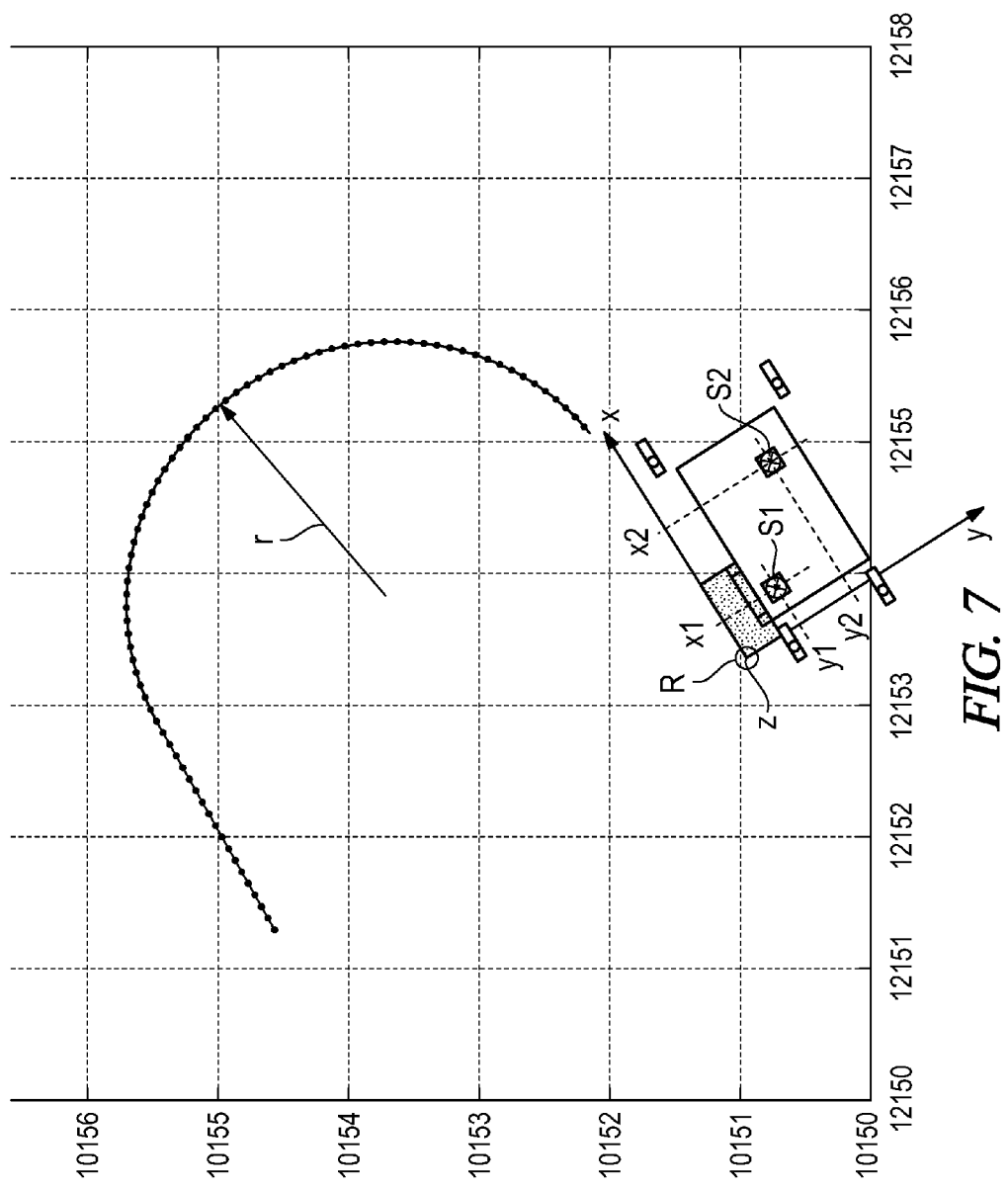
FIG. 7 is a view of the desired curve defining a cigar-shaped object for controlling the civil engineering machine, after it has been transposed into the measurement co-ordinate system (X,Y,Z).

FIGS. 6 and 7 show the transfer of the freely preset geometrical shape (FIG. 6) to the measurement co-ordinate system (X,Y,Z) (FIG. 7), to allow the desired curve which defines the desired positions of the reference point in the measurement co-ordinate system (X, Y, Z) to be laid down.

The position and orientation of the reference point R on the civil engineering machine at the starting point having been determined and the desired curve having been laid down, the control unit 7 puts the civil engineering machine into operation. The control unit now determines, continuously or at discrete increments of time, the actual position (Xr, Yr) and actual direction ($\Phi$) of the reference point R on the civil engineering machine in the measurement co-ordinate system (X, Y, Z). In so doing the control unit each time calculates the distance D between the desired position P and the actual position (Xr, Yr) and the difference in direction $\Delta\Phi$ between the desired direction $\alpha$ and the actual direction $\Phi$.

Using a preset control algorithm, a drive control component of the control unit 7 calculates from the distance D and the difference in direction $\Delta\Phi$ the value at the time of the manipulated variable for the drive means of the drive unit in such a way that the distance D and the difference in direction $\Delta\Phi$ are minimal, i.e. in such a way that the reference point on the civil engineering machine moves along the desired curve. Control algorithms of this kind are well known to the person skilled in the art.

Figure 8:
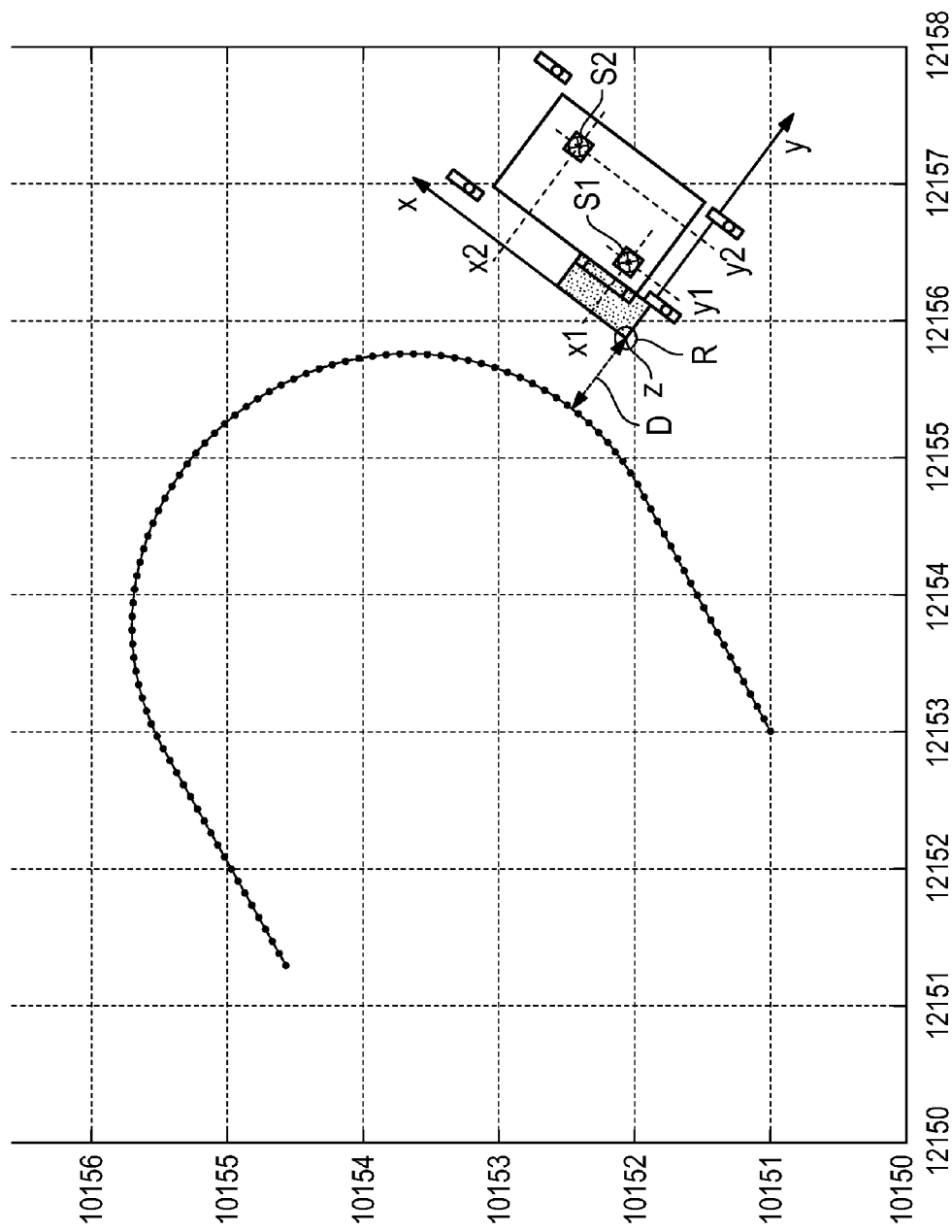
FIG. 8 shows the distance between the desired position of the civil engineering machine as defined by the desired curve and its actual position.
Figure 9:
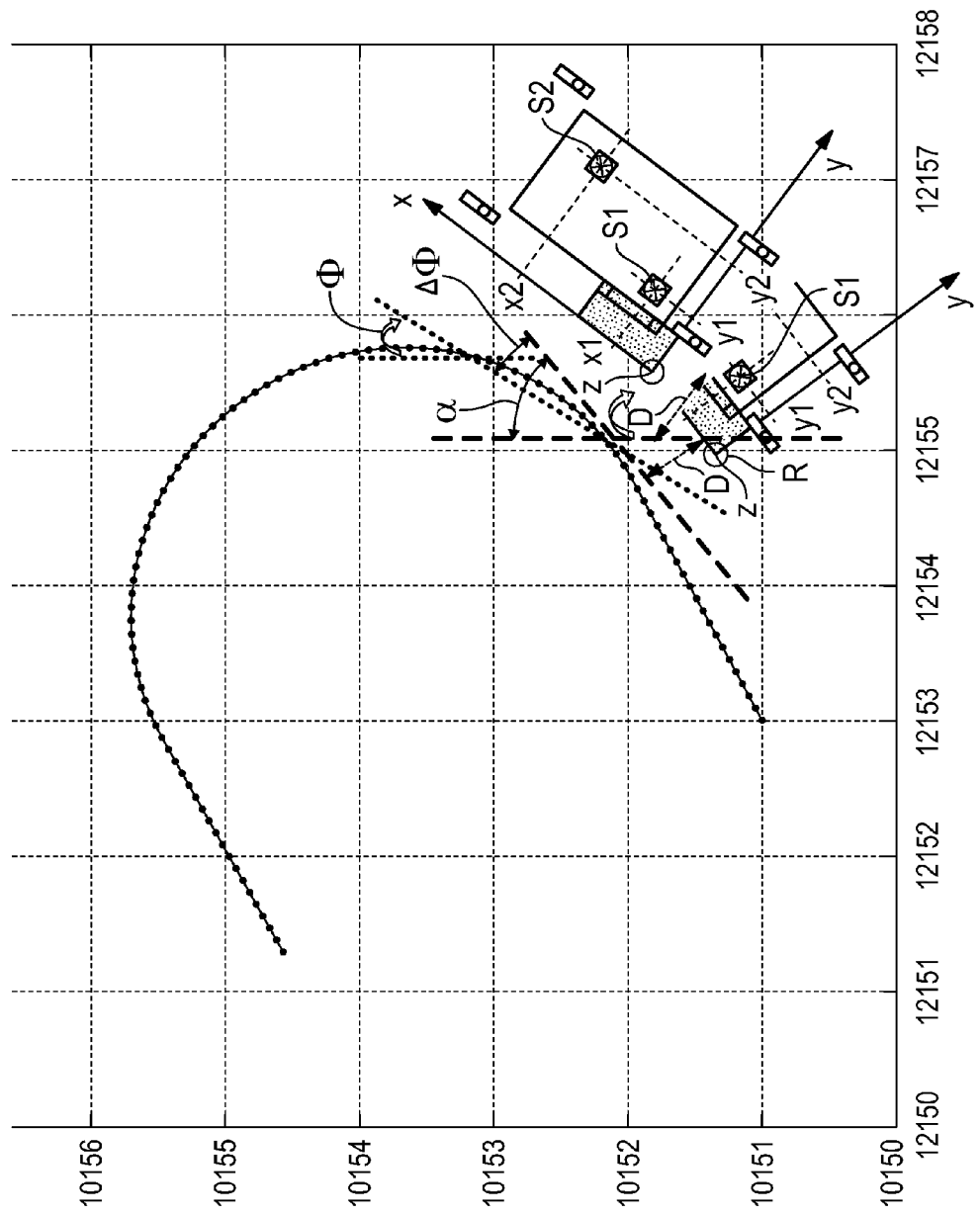
FIG. 9 shows the difference in direction between the desired direction of the civil engineering machine as defined by the desired curve and its actual direction.

FIG. 8 shows the distance D between the desired position of a point on the desired curve and the actual position (Xr, Yr) of the reference point R, while FIG. 9 shows the difference in direction $\Delta\Phi$ between the desired direction $\alpha$ and the actual direction $\Phi$ at a point on the desired curve. The correction to the steering is found as a function of the distance D and the difference in direction $\Delta\Phi$ (correction to steering=f (D, $\Delta\Phi$).

For the presetting of the geometrical shape, i.e. for the presetting of a given object, the control unit has an input unit 7A which is once again merely indicated. The input unit 7A may also be referred to as a shape selection component 7A. In one embodiment, the input unit 7A has means 7B in the form of, for example, a keyboard or a touch screen. From the keyboard or touch screen 7B, the operator of the machine can enter various parameters which define the geometrical shape. The operator may for example enter the length of the straight line and the radius of the arc for a cigar. The input unit 7A may also have means 7B, such for example as a keyboard or touch screen once again, to enable one geometrical shape which defines the desired object to be selected from a plurality of geometrical shapes which are stored in a memory unit 7C of the control unit. As well as for the input of parameters and/or the selection of geometrical shapes, a further embodiment of the control unit 7 also makes provision for the modification of a geometrical shape which has been entered or selected. For example, a cigar whose straight lines are of a preset length and whose arcs are of a preset radius may be selected and then, by entering new parameters for the length of the straight lines and/or the radius of the arcs from the keyboard or touch screen 7B, the cigar which was selected may be adjusted to suit the particular requirements which exist at the site, the cigar being made smaller or larger for example and in particular its width or length being changed.

As well as this, the input unit 7A also has means 7D, in the form of a switch or push-button 7D for example, by which the civil engineering machine can be put into operation on the ground after the positioning and alignment. A switch or push-button 7D may also be provided on the input unit 7A to enable the civil engineering machine to be stopped before it has moved for the entire length of the desired curve. The civil engineering machine having been stopped, new parameters may, for example, then be entered from the keyboard or touch screen 7B to change the path followed by the curve and for example to change the height of the object being produced.

Alternative Techniques

The system described above provides a great deal of flexibility in creating and using preset geometrical shapes to be applied to selected actual ground locations.

More generally, the control unit described above can be described as including:

a shape selection component operable to preset a geometrical shape for the structure to be produced or for the ground to which changes are made;

a position data determination component operable to determine position data to define the position and/or orientation of a reference point on the civil engineering machine in relation to a reference system which is independent of the position and orientation of the civil engineering machine;

a curve data determination component operable to determine curve data to define a desired curve based on the preset geometrical shape of the structure to be produced or the ground to which changes are to be made and based on a desired position and orientation of the preset geometrical shape in the reference system independent of the position and orientation of the civil engineering machine, the desired curve being that curve along which the reference point on the civil engineering machine is to move in the reference system independent of the position and orientation of the civil engineering machine; and a drive control component operable to control the drive unit, as a function of the curve data defining the desired curve, in such a way that the reference point on the civil engineering machine moves along the desired curve.

One way to determine the desired position and orientation of the preset geometrical shape in the reference system independent of the position and orientation of the civil engineering machine is the method described in detail above wherein the shape is first defined in the machine-related coordinate system (x,y,z) and is then transformed into the reference system independent of the position and orientation of the civil engineering machine. In that case, the desired position and orientation of the preset geometrical shape is the position in which the starting point and orientation corresponds to the current location of the reference point R on the civil engineering machine 1 and the current orientation of the civil engineering machine in the independent reference system (X,Y,Z). In that case, the machine is already located at a known point and in a known orientation on the desired curve, and the drive control component 7D may be activated to move the machine along the desired curve.

It will be appreciated that identifying the current position and orientation of the reference point R on the civil engineering machine 1 as a known point and orientation on the desired curve is only one way to determine the curve data defining the desired curve. The curve data for the desired curve can be determined by any technique that will define the location and orientation of the preset shape in the reference system independent of the position and orientation of the civil engineering machine.

In general, once the preset shape has been selected, it is necessary to either identify the location within the independent reference system (X,Y,Z) of at least two identifiable points of the preset shape, or to identify the location within the independent reference system of one identifiable point of the preset shape and identify the orientation of the preset shape within the independent reference system. For example in FIG. 11 a cigar shape is shown defined by two straight line portions and two semi-circular portions of radius "r" having centers M1 and M2. It will be appreciated in viewing FIG. 11 that the location and orientation of the cigar shape curve there shown can be defined by identifying the location in the independent reference system of any two identifiable points on the curve, or by identifying the location of one point plus the orientation of the shape. That orientation may be described by the direction along the shape at the identified point. If the point is on a curved portion of the shape, the direction is preferably defined as the tangent of the curve.

Figure 11:
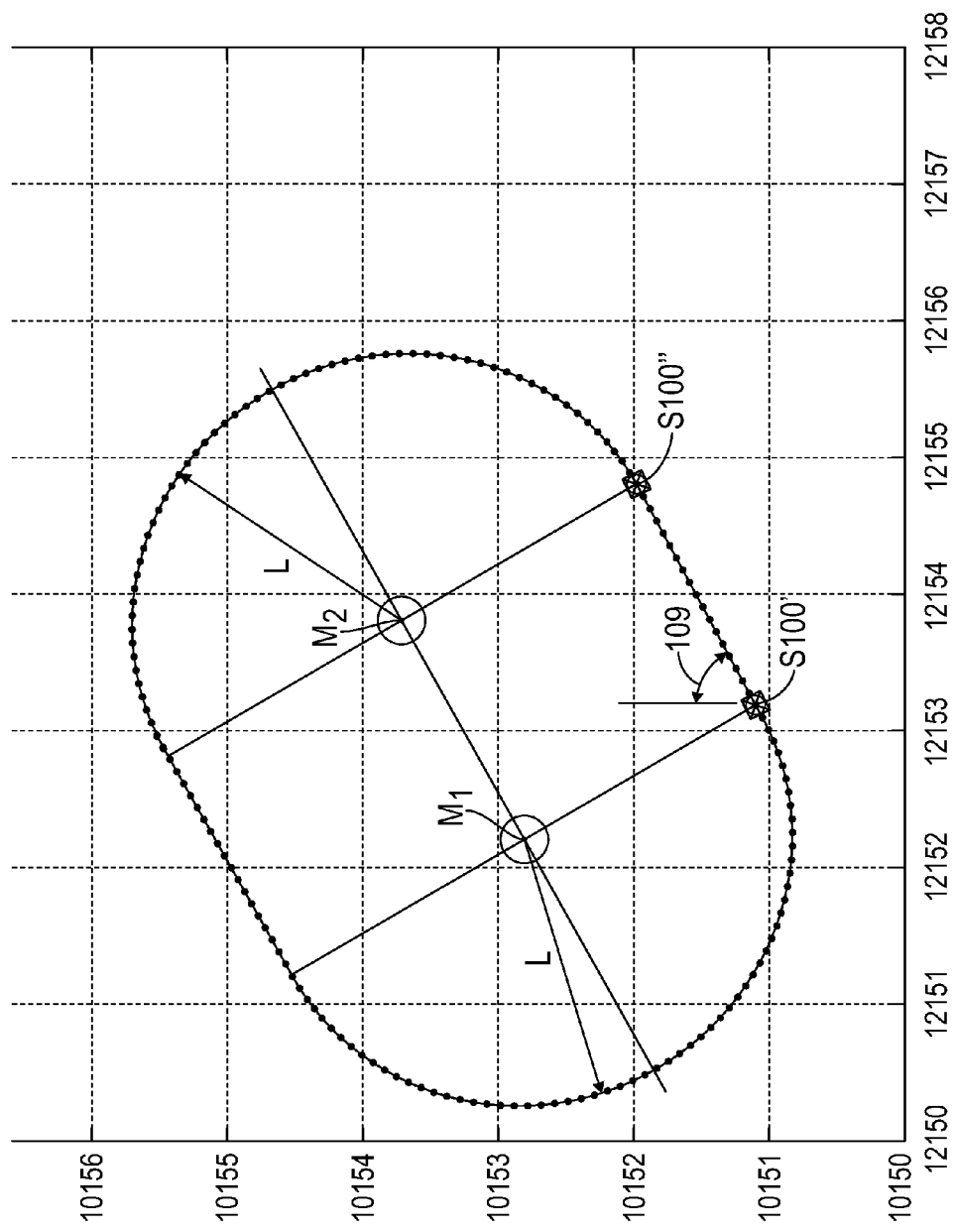
FIG. 11 is a schematic illustration similar to FIG. 7, showing how the location of the preset shape in the independent reference system can be defined by the location of one point of the shape plus an orientation of the shape, or by the location of two points of the shape.

For example, with reference to FIG. 11, the system described above can determine the curve data of the desired curve by the operator inputting information defining the location of a selected point S100' on the preset shape within the independent reference system, and information defining the selected orientation of the preset shape within the independent reference system such as the angle 109 shown in FIG. 11. Then using that input information the data defining the preset shape can be transformed into data defining the desired curve in the independent reference system in the same way as described above for use of the current position and orientation of the reference point R of the civil engineering machine 1 as the input data. This input data may for example be determined on the job site by identifying the desired location of a point on the desired curve within the independent reference system (X,Y,Z). This may be accomplished by surveying the location of a desired starting point for the preset shape within the independent reference system, for example the point S100'. The surveying may be accomplished via a GPS field rover as further described below, or by any other suitable surveying technology. The desired orientation of the preset shape within the independent reference system may also be similarly determined on the job site.

Also, if the desired location in the independent reference system of two points of the preset shape can be identified, that information can then be used to transform the preset shape into curve data defining the desired curve in the independent reference system. In the example of FIG. 11 the two points could be the beginning and ending points S100' and S100" of one of the straight sections of the cigar shape as shown in FIG.

11. The desired location of those two points may be identified in the independent reference system, for example by using the field rover. The information identifying those two points within the independent reference system can then be used as the reference points to transform the data defining the preset shape into curve data defining the desired curve within the independent reference system.

In a situation like either of the alternative examples just described, wherein the reference point of the civil engineering machine is not already located at a known location on the desired curve, it is necessary to move the civil engineering machine to the desired starting point and to orient the civil engineering machine in the desired orientation before beginning the paving or milling or other construction operation of the civil engineering machine. This movement of the civil engineering machine to the desired starting point and orientation can also be automated. The control unit 7 can control the movement of the civil engineering machine from any initial location to any desired point and orientation on the desired curve in the same manner as described above with regard to FIGS. 8 and 9. In practice, the machine operator will typically drive the machine to a location near to the desired curve, and then allow the automated control unit 7 to take over and move the machine precisely into a starting position on the desired curve.

Use of a Field Rover

One way to conveniently gather and input the information defining the desired locations in the independent reference system of corresponding points on the preset shape is to use a GPS field rover to survey the desired location of those points.

It is particularly desirable to use a GPS field rover including a control unit which substantially duplicates the shape selection component, the position data determination component and the curve data determination component of the control unit of the civil engineering machine. This allows the GPS field rover to be used to generate the curve data defining the desired curve in advance of moving the civil engineering machine to the field location. Then the curve data can simply be transferred into the control unit of the civil engineering machine and used to control the operation of the civil engineering machine.

Figure 10:
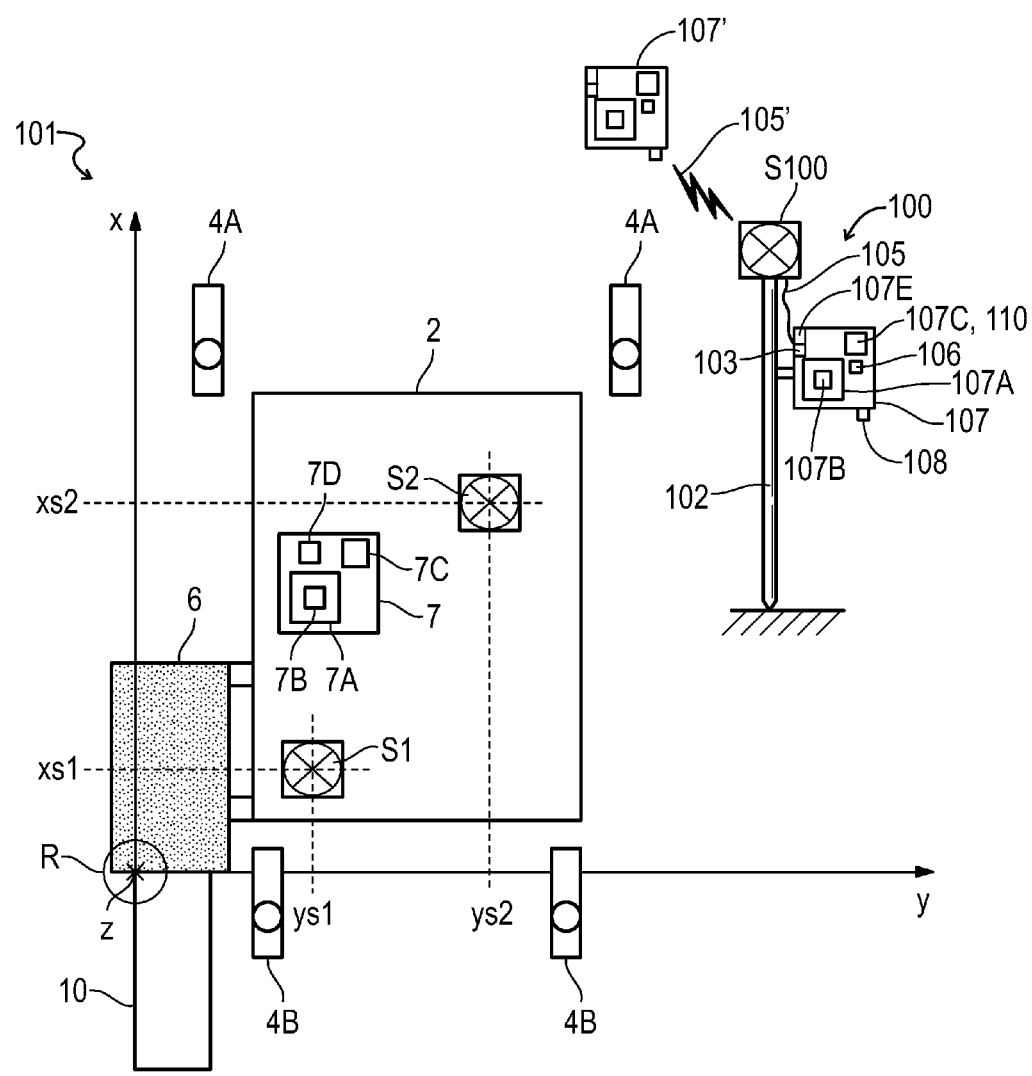
FIG. 10 is a schematic illustration of a civil engineering machine system including a GPS field rover.

A schematic representation of a civil engineering machine system 101 including a field rover 100 is shown in FIG. 10. The rover 100 includes a rod 102. A lower end 104 of the rod is placed on a location on the ground surface for which the GPS coordinates are to be determined. A GPS receiver S100 is located at the upper end of the rod 102 and may be connected to a rover control unit 107 via electrical connection 105. Optionally, the rover control unit may be embodied as a separate hand held control unit 107' connected via wireless connection 105' to the receiver S100 as indicated in FIG. 10. The rover control unit 107 may substantially duplicate the shape selection component, the position data determination component, and the curve data determination component of the control unit of the civil engineering machine. The rover control unit 107 includes a rover position data determination component 107E which receives the signals from the GPS receiver S100 to determine position data to define the position of the field rover 100 in relation to the independent reference system (X,Y,Z). The field rover 100 may also include a radio 103 for communicating with a GPS base station, and a battery 106 to provide power.

The rover 100 may also be constructed for use with any of the other location technologies described above. For example the GPS receiver S100 may be replaced with a prism for use with a total station. Or other satellite based location technologies may be used.

Thus for the pre-setting of the geometrical shape, i.e. for the pre-setting of a given object, the rover control unit 107 has a rover input unit 107A. The rover input unit 107A may also be referred to as a shape selection component 107A. In one embodiment, the rover input unit 107A has means 107B in the form of, for example, a keyboard or a touch screen. From the keyboard or touch screen 107B, the operator of the rover can enter various parameters which define the geometrical shape. The operator may for example enter the length of the straight line and the radius of the arc for a cigar. The rover input unit 107A may also have means 107B, such for example as a keyboard or touch screen once again, to enable one geometrical shape which defines the desired object to be selected from a plurality of geometrical shapes which are stored in a rover memory unit 107C of the rover control unit. As well as for the input of parameters and/or the selection of geometrical shapes, a further embodiment of the rover control unit 107 also makes provision for the modification of a geometrical shape which has been entered or selected. For example, a cigar whose straight lines are of a preset length and whose arcs are of a preset radius may be selected and then, by entering new parameters for the length of the straight lines and/or the radius of the arcs from the rover keyboard or touch screen 107B, the cigar which was selected may be adjusted to suit the particular requirements which exist at the site, the cigar being made smaller or larger for example and in particular its width or length being changed.

The rover control unit 107 has the same capabilities as described above for the machine control unit 7, with regard to the determination of curve data to be used by the machine control unit 7. Thus the rover control unit 107 can take a preset shape and then use information representing the desired location in the independent reference system of at least two identifiable points of the shape or of one point and the orientation of the shape, to create curve data completely identifying the location of the shape in the independent reference system. This portion of the rover control unit 107 comprises a rover curve data determination component.

The rover control unit 107 has an input/output port 108 which allows curve data determined via the rover control unit 107 to be downloaded to a digital media such as a memory stick which can then be used to transfer the curve data to the control unit 7 of the civil engineering machine. Furthermore, additional predefined geometrical shapes and/or pre-processed GPS data can be loaded into the rover memory unit 107C. The data may also be transferred by wireless means or any other suitable technology.

The addition to the civil engineering machine system 101 of the separate field rover 100 having the rover control unit 107 duplicating many of the capabilities of the shape selection component, the position data determination component, and the curve data determination component, greatly increases the flexibility of the system. This allows selected steps to be performed in the machine control unit 7 or in the rover control unit 107, whichever is most convenient.

In one embodiment, as described above with regard to FIGS. 1-9, the machine control unit 7 can be utilized to perform all the functions. In that case the position and orientation of the machine are used to define the position and orientation of the preset shape in the independent reference system (X,Y,Z).

In another embodiment, the field rover 100 can be utilized to gather only partial data for the desired curve location. For example the field rover could be used to survey the location of a starting point S100', which location could then be used by the machine control unit 7 to determine curve data in the independent reference system. The machine could then be driven to the surveyed starting point.

In another embodiment the field rover 100 can be utilized to completely determine the curve data in the independent reference system, and that curve data can be transferred to the machine control unit.

The combined system of the civil engineering machine with its machine control unit 7 and the field rover 100 with its rover control unit 107 provides the ability to deal with any situation which may be encountered in the field.

For example, at a large sophisticated job site, the entire site may have been surveyed and designed in a state plane coordinate system, and the surveyor may have provided pre-processed GPS coordinate files defining all of the structures to be paved on the job site. If those pre-processed files are accurate, they may be loaded into the machine control unit 7 and executed without modification. If the pre-processed GPS coordinate file is unusable because of error or because of the presence of some unexpected obstacle on the ground, the machine operator can edit the file in the machine control unit 7 or in the rover control unit 107 to make it usable. Furthermore, the pre-processed file can be used simply as a shape file, and a new GPS coordinate file may be generated by the machine control unit 7 or by the rover control unit 107 to move that shape to any desired location and orientation within the independent reference system.

In another example, the designer of the job site may have pre-surveyed the site and placed pins or stakes in the ground identifying the locations of a series of surveyed points along the ground surface, which points identify the desired curve on the ground surface. In the prior art such pre-surveyed points are utilized to build a stringline to guide the civil engineering machine. With the present system, the field rover 100 may be utilized to create a virtual stringline by using the rover to identify the locations of those pre-surveyed points, and then to define the desired curve within the independent reference system. The curve data defining that virtual stringline may then be transferred into the machine control unit 7.

In another example the job site designer may have only provided a paper plan specifying the desired locations of various structures on the jobsite. There may be no pre-processed GPS files and no pre-surveyed ground locations. In that situation either the machine control unit 7 or the rover control unit 107, or a combination of both, may be utilized to determine the curve data defining the desired curve in the independent reference system.

In still another example, there may not even be a paper plan. There may just be a job site, and structures may be designed on site by selecting or creating a preset shape, and then determining the curve data to define the desired curve for that shape within the independent reference system. That can be done with either the machine control unit 7 or the rover control unit 107, or a combination of both, in any of the manners described above.

In general the machine control unit 7 and the rover control unit 107 together should collectively provide the various control unit components described above. The machine control unit 7 and the rover control unit 107 may completely duplicate all functions to provide redundant capability. Or selected control unit components may be provided by either one or both of the control units.

The minimum capability that should be present in the rover control unit 107 is to provide the rover position data determination component. The rover control unit 107 may also provide the shape selection component and/or the curve data determination component.

Use of Field Rover to Design Shapes

The rover 100 can also be utilized to easily create new complex shapes. The rover can survey a series of points on a ground surface identifying the shape which is to be created. The rover control unit 107 can then define a shape based upon the series of points. That shape can then be saved in the memory 107C for subsequent use, and it can also be transferred to the machine control unit 7.

In order to create these new complex shapes, the rover control unit 107 may include a shape fitting component 110 embodied in software which may be stored in the memory 107C. The functionality of the shape fitting component 110 is schematically illustrated in the flow chart of FIG. 12. Various representative screen shots illustrating embodiments of the touch screen 107B corresponding to various features of the shape fitting component 110 are illustrated in FIGS. 13-16.

The shape fitting component 110 may be generally described as a shape fitting component configured to define a defined shape corresponding to a series of surveyed positions. As is further explained below, the shape fitting component 110 is preferably configured such that a user may select for at least some of the surveyed positions whether the positions are part of a straight line portion of part of a curved portion of the defined shape. After definition of the defined shape, the defined shape may be stored in memory 107C. The shape fitting component 110 may include a shape smoothing component 112 configured such that the user may selectively use position data in defining the defined shape. The shape smoothing component is configured such that the user may select for each surveyed position, or at least some of the surveyed positions, to not include the position data in defining the defined shape or to use the position data for the surveyed position only with regard to either elevation position or horizontal position of the defined shape.

An example of the manner of use of the shape fitting component 110 in association with the display and input functions of the touch screen 107B as illustrated in FIGS. 13-16 will now be described.

Starting for example with a straight line curb with uniform slope, if the user knows where the curb is to be located in the field, the field rover 100 may be placed on the ground at the starting point of the curb.

Figure 13:
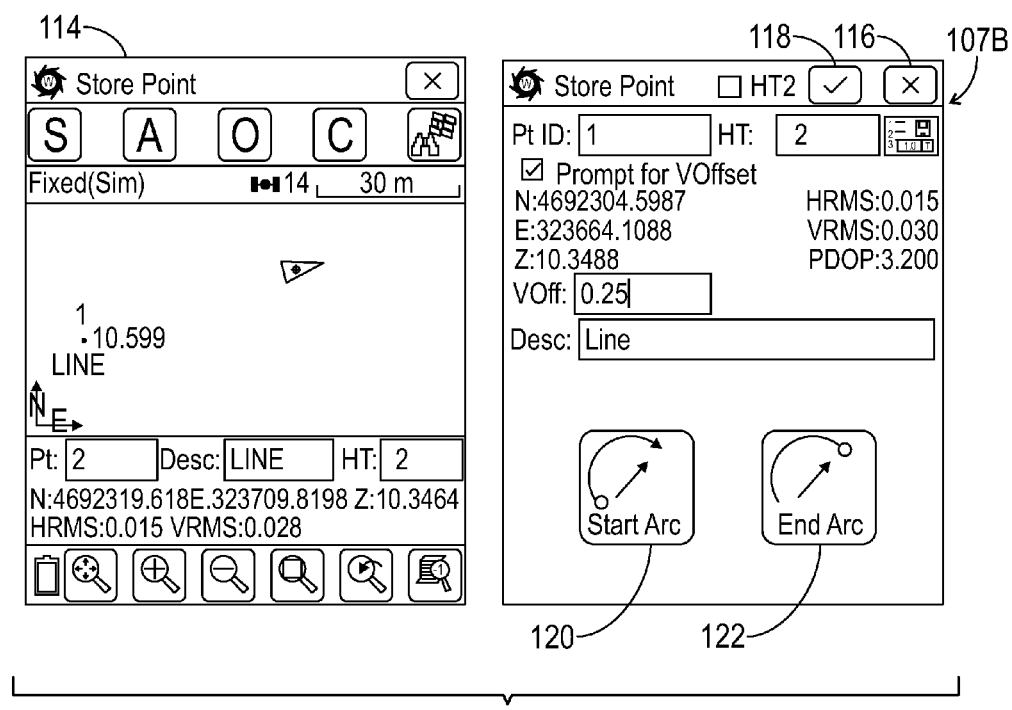
FIG. 13 is a screen shot of a display screen of the field rover showing display of surveyed points and an input screen.

FIG. 13 illustrates the display of the touch screen 107B having on the left hand side a display 114 of the surveyed points and subsequently of the shape defined by those points, and having on the right hand side 116 an input screen. In FIG. 13 the first surveyed point is indicated by the numeral 1. After measuring the first point 1, the user is prompted to decide whether the point is part of a straight line portion or a curved portion of the defined shape. This query is answered by the selective use of an enter button 118, a start arc 120 and an end arc button 122. If the point surveyed lies on a straight line the query is answered simply by touching the enter button 118. If the point is to lie on a curve then either the start arc button 120 or end arc button 122 is pressed. It is noted that a curved portion of the defined shape may be an actual arc of a circle, but more generally a curved portion is a portion that is not substantially straight and the curved portion does not have to be an arc of a circle.

Additionally, the right hand side 116 of input screen 107B illustrates a prompt for a vertical offset. For example, if the user is surveying the base of a subgrade, and the user knows that the top of the pavement is for example 0.25 meters higher than the subgrade, then the user can enter a vertical offset "VOff" of 0.25 as shown, representing the top of the pavement.

Figure 12:
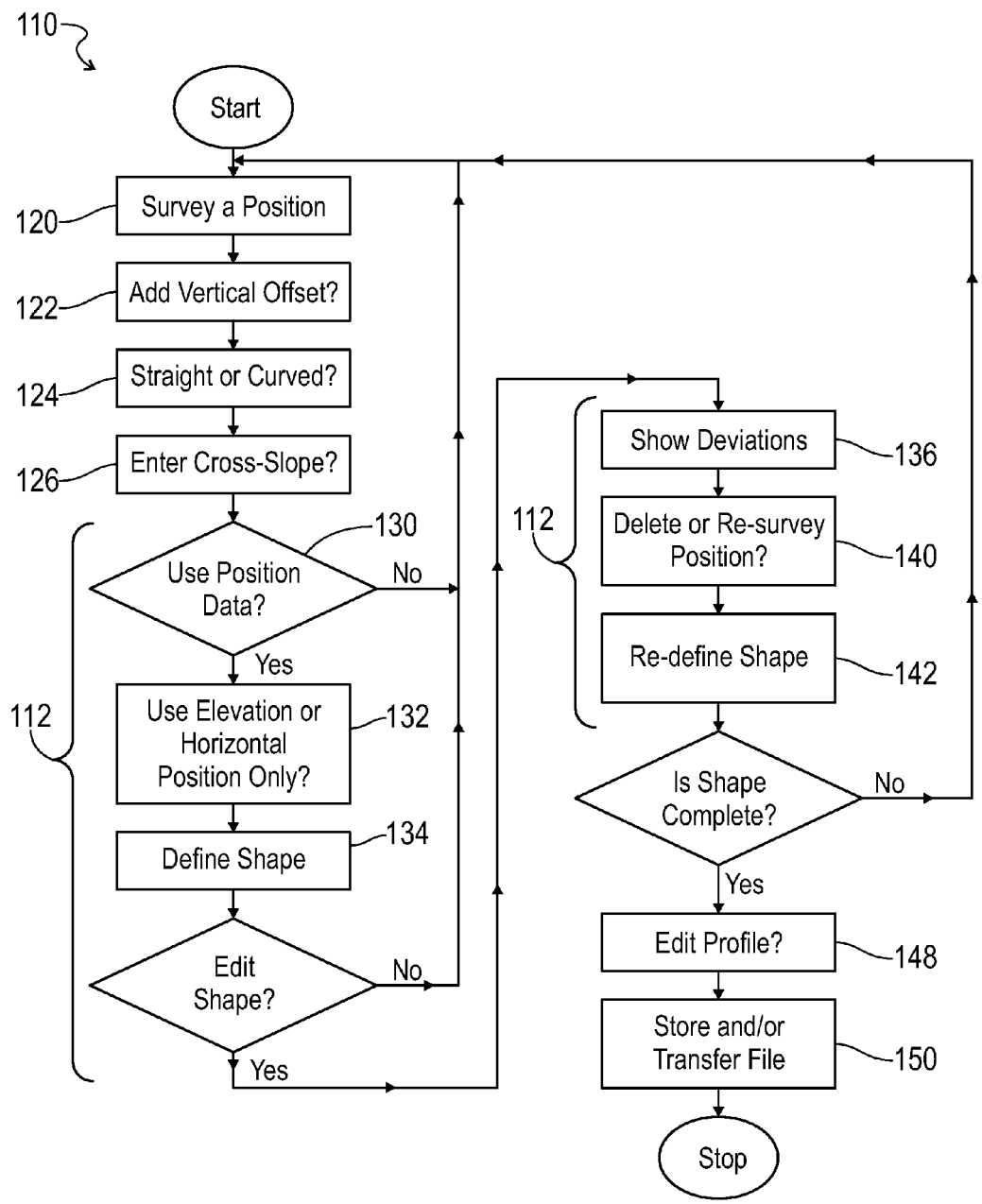
FIG. 12 is a schematic flow chart representation of a shape fitting component of the field rover control unit.

In the flow chart of FIG. 12, the surveying of a position such as position 1 is indicated at block 120, the addition of vertical offset is illustrated in the block 122, and the response to the query as to whether the point is part of a straight portion or a curved portion of the shape is indicated at block 124.

The shape fitting component may also query as indicated at block 126, whether the user wishes to enter a cross slope value associated with each measured point, in order to generate an additional file which will automatically control the cross slope of the civil engineering machine.

Figure 14:
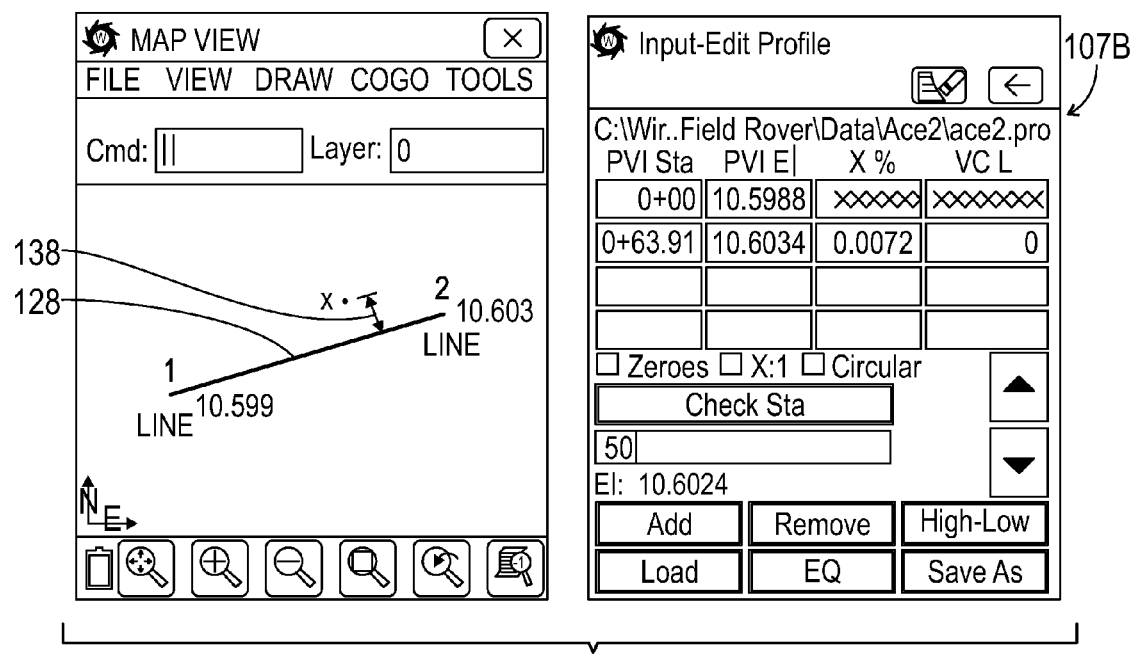
FIG. 14 is another screen shot similar to FIG. 13, wherein a second point has been surveyed and a straight line portion of a defined shape has been displayed.

In this most simple example of defining a straight line portion of the defined shape, an end point 2 of the straight line portion may be surveyed as illustrated in FIG. 14, and a straight line portion 128 of a defined shape may be defined joining the beginning and ending points 1 and 2 of the straight line portion.

It is noted that in general the defined shape being defined is a three dimensional shape, wherein each surveyed or determined position has both a horizontal position in two dimensions as illustrated from the left hand side of FIGS. 13 and 14, and a vertical or elevation position.

Thus, even when defining a straight line portion such as 128, additional positions may be surveyed between the beginning and ending points 1 and 2, which additional positions may for example be utilized simply to provide elevation position data for the straight line portion 128. In general, as indicated at block 130 in FIG. 12 the user may select whether or not to use the data for any surveyed position, and as further indicated in block 132 the user may select whether to use data from a given surveyed position only for purposes of defining elevation position of the shape or only for purposes of defining horizontal position of the shape, or both.

As each surveyed position is added to the group of surveyed positions from which the defined shape is to be defined, the algorithms contained in the software defining the shape fitting component 110 will define or redefine the defined shape based on the available data as indicated at block 134.

At any time during the gathering of survey data defining the various surveyed positions, the shape fitting component may be prompted to display the defined shape as shown for example in FIG. 14. As indicated at block 136 the display may show the deviation 138 (see FIG. 14) of any given surveyed point X from the defined line. As indicated at block 140 the user may choose to delete a point, or to resurvey the position of a selected point. If the user chooses to resurvey a position then the position data for that point will be substituted for the original position data and then as indicated at block 142 the shape fitting component 110 will redefine the defined shape 142 based upon the modified data.

As long as additional data for additional surveyed positions is to be added, the process repeats by returning to block 120 and surveying those additional positions.

As previously noted, the defined shape may include curved portions. Those curved portions may be adjacent to and extend from adjacent straight portions, as for example previously shown in FIG. 11. Also, a curved portion or an additional straight portion may be spaced from the first straight portion 128 of the defined shape.

Figure 15:
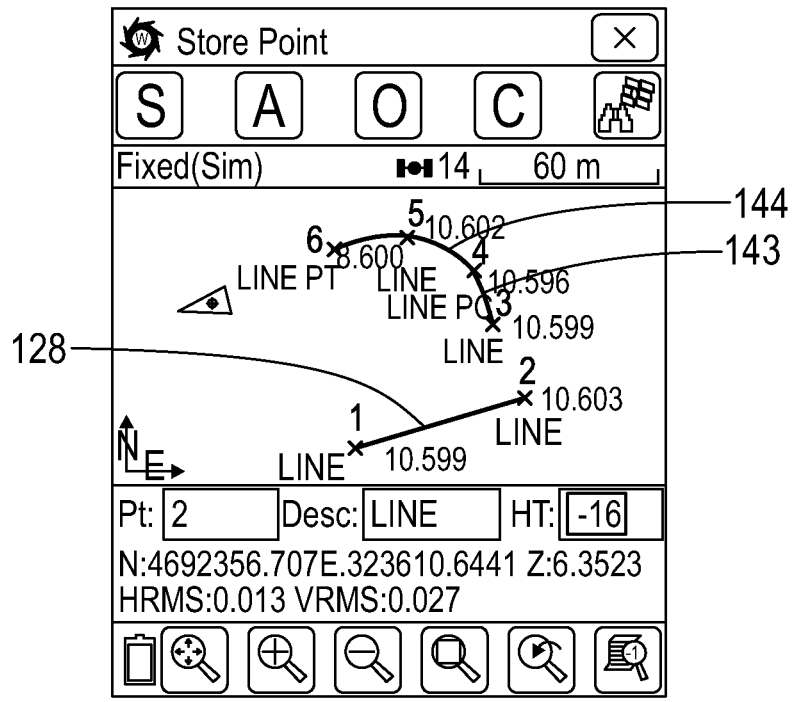
FIG. 15 is another screen shot illustrating the addition of four more surveyed points defining a second straight line portion and a curved portion.

As shown for example in FIG. 15, additional points 3, 4, 5 and 6 have been surveyed. In the example of FIG. 14, an additional straight line segment is defined between points 3 and 4. There is a gap or spacing between points 2 and 3. A curved portion is defined by points 4, 5 and 6.

In general there are several options for how to create a curved portion utilizing the shape fitting component. The choice will depend on the amount of data which is available to the user, and the type of curve to be defined, though several options include:

1. If the curve is an arc, and if Start point (=PC) and End point (PT) and the design radius are known and given to the user, that is sufficient to define the arc.
2. If the curve is an arc, and if Start point and End point and a third point which lays on the arc are given to the user, that is sufficient to define the arc.
3. If the curve is an arc, and if Start point and End point are not precisely defined, but a third point which lays on the arc is given to the user, that is sufficient to define the arc.
4. If the curve is a more complex shape that is not an arc, and if Start point and End point are not precisely defined and there are more than 2 points on the curve (e.g. a spiral curve with undefined radius), then an algorithm is used to define a curve corresponding to the data points.
5. A complex curve may also be represented as a series of many relatively short straight lines.

Regardless of which option is used, the user starts a curve by tapping on the "Start Arc" button 120 and takes the measurements for the various surveyed positions based on whatever information is available. The algorithms utilized by the shape fitting component 110 will always create a smooth shape which is tangential to the element measured before the curve starts and tangential to the element after the curve ends. Any suitable mathematical method may be utilized to define a defined curve corresponding to the series of data points. One suitable mathematical method is a Bezier curve, which is an elegant method of approximating lines between a flexible number of data points defining the curve. The calculated curve is very suitable for designing roadways and railways as it results in a smooth and homogenous line.

It is noted that in an actual field situation, the user may not know for certain whether a given portion of the structure being surveyed is best represented as a straight line portion or as a curved portion. In such a case it is better to define that portion of the structure as a curve and to provide at least four surveyed points. Also, if the user is not certain where the start and end point of a curved portion resides, it is better to start the curve early and finish it later in order to generate a smooth transition between the straight and curved elements of the defined shape.

If the curve changes direction, this is accomplished simply by starting a new curve at the point of inflection.

The curved portion is ended when the entire curve transitions into a straight line. At the end of the curved portion, the user presses the "End Arc" button 122 and the algorithm will automatically calculate the defined curved portion such as 144 seen in FIG. 15.

Figure 16:
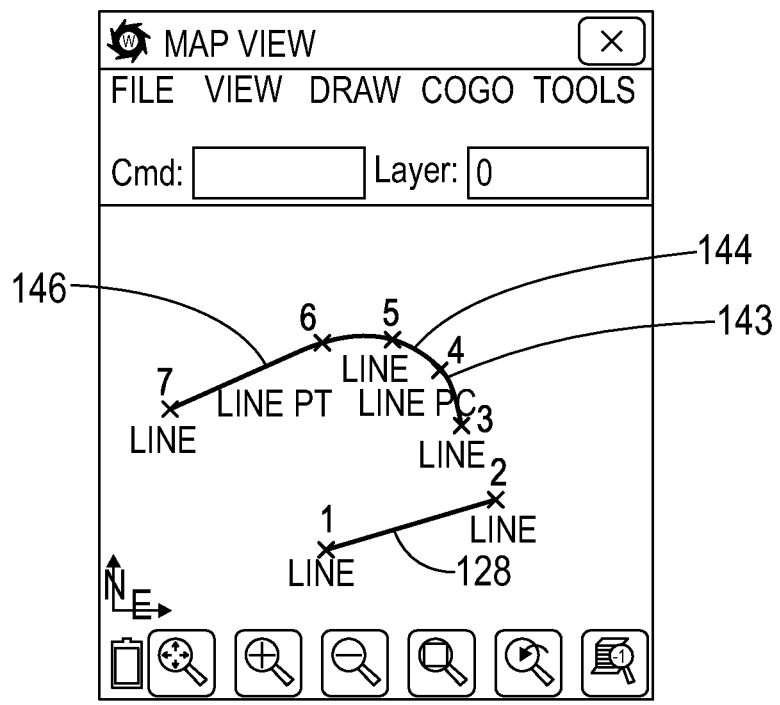
FIG. 16 is another screen shot illustrating the addition of a seventh surveyed point defining a third straight line portion.

FIG. 16 illustrates a further continuation of the process where an additional point 7 has been surveyed to define an additional straight line portion 146 between points 6 and 7. Thus, for example the structures indicated in FIG. 16 might indicate the locations of curbing in a parking lot with a gap between points 2 and 3 for an entrance into the parking lot.

As indicated at block 148 of FIG. 12, the shape fitting component 110 further provides for the editing of the vertical profile of the defined shape. For example, the user may be provided with construction plans for the project which define the desired slope between various points on the defined shape. Thus, any field measurements taken may be modified to conform them as desired to define a defined shape having the desired vertical profile.

Once the defined shape has been fully defined, as indicated at block 150 a shape storing component 150 of the control unit 107 stores in the memory 107C the data defining the defined shape. That defined shape is preferably defined as a series of one or more straight line portions and/or one or more curved portions. Each straight line portion may be defined by a direction and a length. If the curved portion is an arc, it may be defined by a radius of curvature and a length. If the curved portion is a complex curve it may be defined in more complex format, such as by a Bezier curve or by other suitable curve fitting technique, or it may be defined as a series of many short straight line segments. Such data may for example be similar in format to the data shown in the following Table I defining the shapes shown in FIG. 16. The data of Table I is provided as an example only, and is not intended to be in any way limiting of the scope of the claims.

TABLE I

| SEG-MENT | Type of Element | Ending Station | Northing | Easting | Line/Arc Length | Tangent Out |
|---|---|---|---|---|---|---|
| 128 | Line | 4.696 | 5849.596 | 3322.980 | 4.696 | 73.1432 NE |
| 143 | Line | 1.487 | 5851.695 | 3320.968 | 1.487 | 30.3803 NW |
| 144 | Curve | 3.987 | 5852.631 | 3318.822 | 2.500 | 77.4446 SW |
| 146 | Line | 5.987 | 5852.206 | 3316.868 | 2.00 | 77.4446 SW |

After the defined shape is defined and stored in memory, it may be saved in either of two formats. First, the data gathered by the rover using GPS co-ordinates may be saved in the GPS co-ordinates representing the shape in the reference system independent of the position and orientation of the civil engineering machine. In this first instance, the file may simply be loaded into controller 7 of the civil engineering machine and used without further transformation. Second, the data may be saved in a format like that of the Table above, defining the shape as a series of straight and curved lines with lengths and directions. In this second instance, the shape file may be utilized like any other pre-stored shape and may be selected and used. The selected shape defined as a series of distances and directions in the reference system of a civil engineering machine may be transformed into curve data representative of the location and orientation of the selected shape in the reference system independent of the civil engineering machine.

Alternatively instead of transferring the data from the rover control unit 107 to the machine control unit 7, the civil engineering machine may be provided with an interface or docking station 160 which allows the rover control unit 107 to be connected to the civil engineering machine. When the rover 100 is docked with the civil engineering machine the rover can perform various functions on the civil engineering machine, including serving as one of the position sensors of the civil engineering machine and/or serving as at least a part of the control unit of the civil engineering machine.

Figure 17:
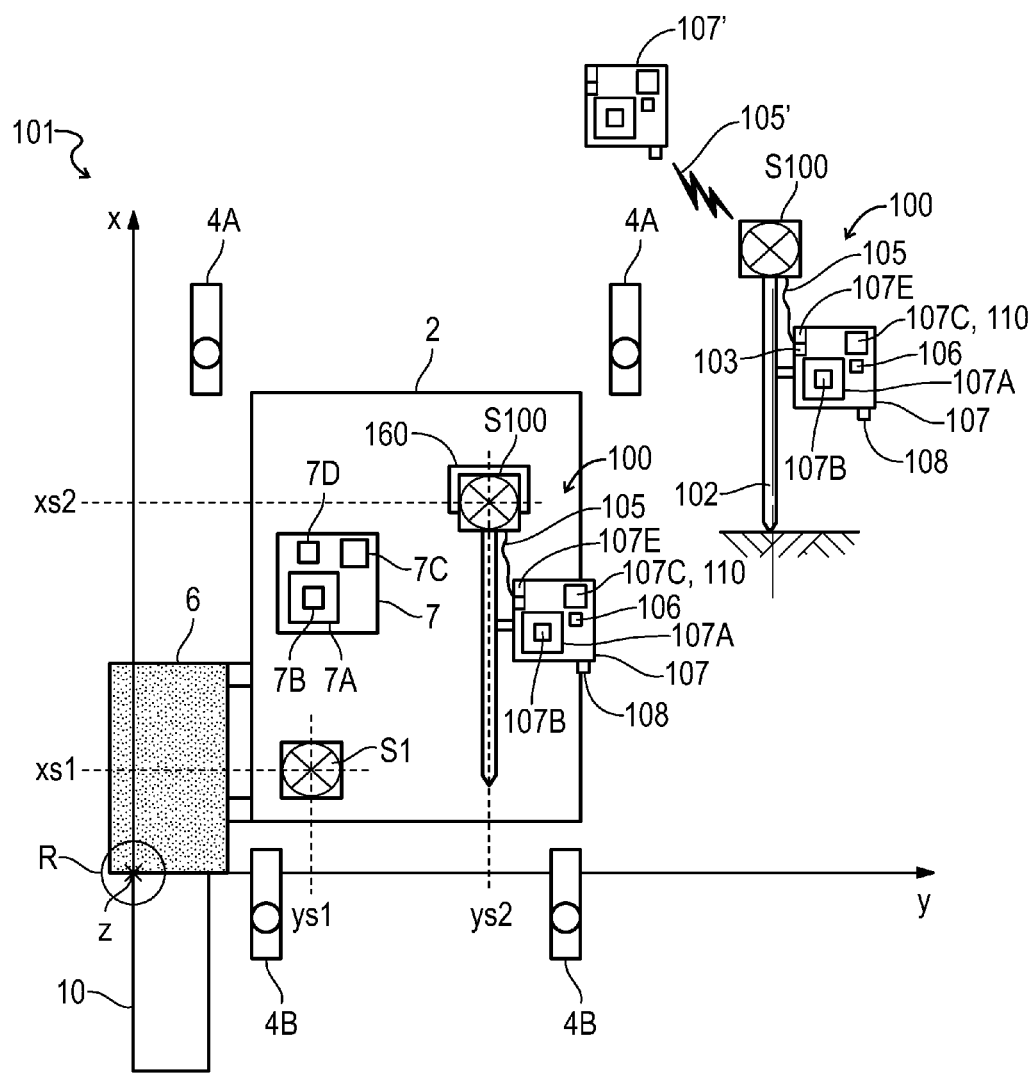
FIG. 17 is a schematic illustration similar to FIG. 10 showing an alternative embodiment wherein the field rover may be mounted on the civil engineering machine for use as one of the receivers of the civil engineering machine.

For example, as schematically illustrated in FIG. 17, the rover 100 may be constructed to be mounted on the chassis 2 of the civil engineering machine by engaging the rover 100 with the docking station 160, so that the receiver S100 of the rover 100 takes the place of the receiver S2 of the civil engineering machine. In this embodiment, when it is desired to survey various positions on the ground located remotely from the civil engineering machine, the rover 100 may be undocked and used to survey those ground locations as indicated. Then the rover may be again docked with the civil engineering machine and serve in the role of one of the receivers of the civil engineering machine. When docked in the docking station 160 the rover control unit 107 may be communicated with the machine control unit. 7

Figure 18:
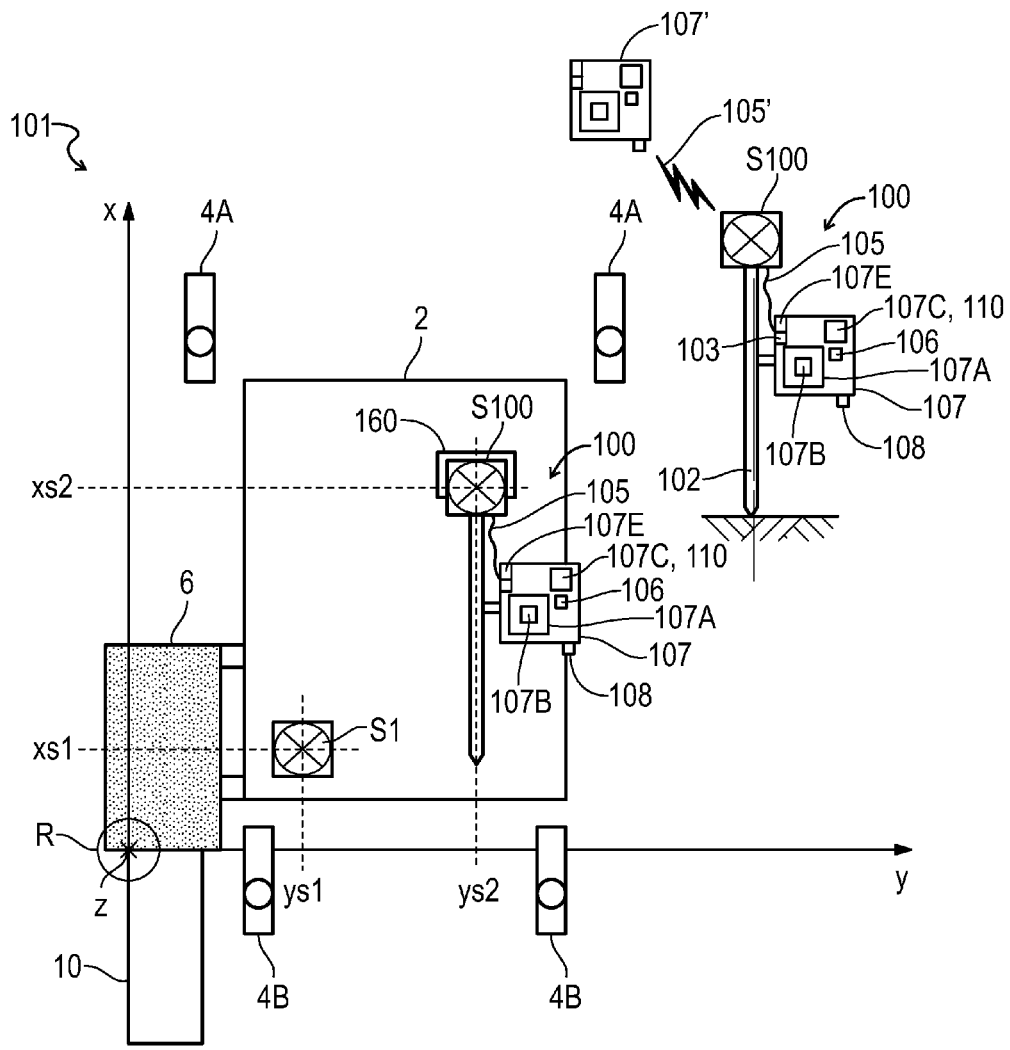
FIG. 18 is a schematic illustration similar to FIG. 17 showing another alternative embodiment wherein the rover control unit of the field rover is used as the machine control unit of the civil engineering machine.

Further, as schematically illustrated in FIG. 18, when the rover 100 is docked with the civil engineering machine the rover control unit 107 may be used as the machine control unit for the civil engineering machine, and the separate machine control unit 7 may be eliminated.

Thus it is seen that the apparatus and methods of the present invention readily achieve the ends and advantages mentioned, as well as those inherent therein. While certain preferred embodiments of the invention have been illustrated and described in the present disclosure, numerous changes in the arrangement and construction of parts and steps may be made by those skilled in the art, which changes are encompassed within the scope and spirit of the present invention which is defined by the appended claims.

What is claimed is:

1. A method of controlling a self-propelled civil engineering machine, the civil engineering machine including a reference point, the method comprising:
   (a) presetting of a geometrical shape for a structure to be produced or the ground to which changes are to be made;
   (b) determining with a field rover a position of at least one identifiable point of the preset geometrical shape in a reference system independent of the position and orientation of the civil engineering machine;
   (c) determining curve data defining a desired curve, on the basis of the preset geometrical shape for the structure to be produced or the ground to which changes are to be made and on the basis of the position of the at least one identifiable point of the preset geometrical shape in the reference system independent of the position and orientation of the civil engineering machine, the desired curve being that curve along which the reference point on the civil engineering machine is to move in the reference system independent of the position and orientation of the civil engineering machine;
   (d) determining data which defines a position and/or orientation of the reference point on the civil engineering machine in relation to the reference system independent of the position and orientation of the civil engineering machine; and
   (e) controlling the civil engineering machine with a machine control unit, as a function of the curve data defining the desired curve, in such a way that that the reference point on the civil engineering machine moves along the desired curve;
   wherein during step (b) the field rover is separate from the civil engineering machine, and after step (b), data representing the position of the at least one indentifiable point of the present geometrical shape are transferred from the field rover to the machine control unit.

2. The method according to claim 1, wherein:
   step (a) is performed with a rover control unit of the field rover.

3. The method according to claim 2, wherein step (a) comprises the input into the rover control unit of parameters defining the geometrical shape.

4. The method according to claim 2, wherein step (a) comprises the selection with the rover control unit of one geometrical shape from a plurality of geometrical shapes.

5. The method of claim 2, wherein step (a) is performed when the field rover is located remotely from the civil engineering machine.

6. The method of claim 2, wherein step (a) is performed when the field rover is mounted on the civil engineering machine.

7. The method according to claim 1, wherein:
step (a) is performed with the machine control unit of the civil engineering machine.

8. The method according to claim 1, wherein:
step (c) is performed with a rover control unit of the field rover.

9. The method according to claim 8, wherein:
step (c) is performed when the field rover is located remotely from the civil engineering machine; and
the method further comprises transferring the curve data from the rover control unit to the machine control unit.

10. The method according to claim 8, wherein:
step (c) is performed when the field rover is mounted on the civil engineering machine.

11. The method according to claim 1, wherein:
step (c) is performed with the machine control unit of the civil engineering machine.

12. The method according to claim 1, further comprising:
mounting the field rover on the civil engineering machine, and using the mounted field rover at least in part to perform step (d).

13. The method according to claim 1, wherein:
step (d) is performed entirely separately from any action of the field rover.

14. The method according to claim 1, further comprising:
mounting the field rover on the civil engineering machine, and using a rover control unit of the field rover as the machine control unit of step (e).

15. The method according to claim 1, wherein:
in step (d), an initial position of the reference point on the civil engineering machine in relation to the reference system independent of the position and orientation of the civil engineering machine is not on the desired curve; and
further including, prior to step (e), controlling of the civil engineering machine with the machine control unit in such a way that the reference point on the civil engineering machine moves to a point on the desired curve.

16. The method according to claim 1, wherein:
in step (a), the geometrical shape is initially defined by initial shape data in a machine-related coordinate system defined relative to the civil engineering machine; and
in step (c) the curve data is determined in the reference system independent of the position and orientation of the civil engineering machine by transforming the initial shape data.

17. The method according to claim 1, wherein:
steps (a), (b) and (c) are performed simultaneously by using the field rover to determine a series of surveyed positions in the reference system independent of the position and orientation of the civil engineering machine, to select for at least some of the surveyed positions whether the positions are part of a straight line portion or part of a curved portion of the desired curve, and to define the desired curve corresponding to the series of surveyed positions.

18. A self-propelled civil engineering machine system, comprising:
a civil engineering machine including a machine chassis;
a working unit arranged on the chassis and operable to produce a structure on the ground or to make changes to the ground;
a drive unit operable to perform movements of the civil engineering machine in translation and/or rotation on the ground;
a machine control unit operable to control movements of the civil engineering machine in translation and/or rotation on the ground; and
a field rover mounted on the civil engineering machine and being removable from the civil engineering machine so that the field rover may be used separately from the civil engineering machine, the field rover including a rover control unit, the rover control unit including a rover position data determination component operable to determine position data to define the position of the field rover in relation to a reference system which is independent of the position and orientation of the civil engineering machine;
wherein each of the following components is included in at least one of the machine control unit and the rover control unit:
a shape selection component operable to preset a geometrical shape for the structure to be produced or for the ground to which changes are to be made;
a machine position data determination component operable to determine position data to define the position and/or orientation of a reference point on the civil engineering machine in relation to the reference system which is independent of the position and orientation of the civil engineering machine;
a curve data determination component operable to determine curve data to define a desired curve based on the preset geometrical shape of the structure to be produced or the ground to which changes are to be made and based on a desired position and orientation of the preset geometrical shape in the reference system independent of the position and orientation of the civil engineering machine, the desired curve being that curve along which the reference point on the civil engineering machine is to move in the reference system independent of the position and orientation of the civil engineering machine; and
a drive control component operable to control the drive unit, as a function of the curve data defining the desired curve, in such a way that the reference point on the civil engineering machine moves along the desired curve.

19. The system of claim 18, wherein:
the machine control unit includes the shape selection component, the machine position data determination component, the curve data determination component and the drive control component.

20. The system of claim 19, wherein:
the rover control unit also includes the shape selection component and the curve data determination component.

21. The system of claim 18, wherein:
the civil engineering machine includes a docking station for receiving the rover and interfacing the rover control unit with the machine control unit; and
when docked with the civil engineering machine, the rover position data determination component comprises at least a part of the machine position data determination component.

22. The system of claim 18, wherein:
both the machine control unit and the rover control unit include the shape selection component.

23. The system of claim 18, wherein:
only one of the machine control unit and the rover control unit include the shape selection component.

24. The system of claim 18, wherein:
both the machine control unit and the rover control unit include the curve data determination component.

25. The system of claim 18, wherein:
only one of the machine control unit and the rover control unit include the curve data determination component.

26. The civil engineering machine system according to claim 18, wherein:
the rover position data determination component includes a DGPS receiver for decoding GPS satellite signals from a satellite-based global positioning system and correcting signals from a reference station for determining the position of the field rover.

27. The civil engineering machine system according to claim 18, wherein:
the rover position data determination component includes a receiver belonging to a non-satellite measuring system for determining the position of the field rover.

28. The civil engineering machine system according to claim 18, wherein:
the rover shape selection component includes an input unit operable for the input of parameters to define the geometrical shape of the structure to be produced or the ground to which changes are to be made.

29. The civil engineering machine system according to claim 28, wherein the parameters are parameters which define the length of a straight line and/or the radius of an arc of a circle.

30. The civil engineering machine system according to claim 18, wherein:
the shape selection component includes an input unit operable to select one geometrical shape from a plurality of pre-defined geometrical shapes.

31. The civil engineering machine system according to claim 30, wherein the rover control unit has a storage unit which co-operates with the input unit and in which the plurality of pre-defined geometrical shapes are stored.

32. The civil engineering machine system according to claim 30, wherein the input unit is operable to modify a pre-determined geometrical shape.

33. The civil engineering machine system according to claim 18, wherein:
the drive control component is configured to control the drive unit to steer the reference point on the civil engineering machine to a point on the desired curve when the reference point is not initially located on the desired curve.

34. A self-propelled civil engineering machine system, comprising:
a civil engineering machine including a machine chassis;
a working unit arranged on the chassis and operable to produce a structure on the ground or to make changes to the ground;
a drive unit operable to perform movements of the civil engineering machine in translation and/or rotation on the ground; and
a machine control unit operable to control movements of the civil engineering machine in translation and/or rotation on the ground, the machine control unit including:
a machine position data determination component operable to determine position data to define the position and/or orientation of a reference point on the civil engineering machine in relation to a reference system which is independent of the position and orientation of the civil engineering machine, the machine position data determination component including a field rover mounted on the civil engineering machine, the field rover being removable from the civil engineering machine so that the field rover may be used separately from the civil engineering machine to survey positions in the reference system independent of the position and orientation of the civil engineering machine.

35. The civil engineering machine system according to claim 34, wherein:
the machine control unit is included in the field rover and comprises a field rover control unit.

36. The civil engineering machine of claim 34, wherein:
the machine control unit further comprises a machine shape selection component operable to preset a geometrical shape for the structure to be produced or for the ground to which changes are made.

37. The civil engineering machine of claim 36, wherein:
the machine control unit further comprises a machine curve data determination component operable to determine curve data to define the desired curve based on the preset geometrical shape of the structure to be produced or the ground to which changes are to be made and based on a desired position and orientation of the preset geometrical shape in the reference system independent of the position and orientation of the civil engineering machine.

* * * * *